United States Patent [19]
Miyamoto et al.

[11] Patent Number: 5,462,811
[45] Date of Patent: Oct. 31, 1995

[54] MAGNETO-OPTICAL RECORDING MEDIA AND MANGETO-OPTICAL DEVICE USING THE MEDIA

[75] Inventors: Harukazu Miyamoto, Kodaira; Makoto Miyamoto, Yokohama; Keikichi Andoo, Musashino; Toshio Niihara, Sayama; Masahiro Ojima, Nerima, all of Japan

[73] Assignees: Hitachi, Ltd., Tokyo; Hitachi Maxwell, Ltd., Osaka, both of Japan

[21] Appl. No.: 865,343

[22] Filed: Apr. 8, 1992

[30] Foreign Application Priority Data

Apr. 11, 1991 [JP] Japan .................................. 3-078817
Jul. 23, 1991 [JP] Japan .................................. 3-182572

[51] Int. Cl.$^6$ .................................................. G11B 5/66
[52] U.S. Cl. ........................... 428/694 EC; 428/694 ML; 428/694 MM; 428/694 DE; 369/13; 369/14
[58] Field of Search ........................... 428/694, 900, 428/694 ML, 694 MM, 694 EC, 694 DE; 369/13, 14, 900

[56] References Cited

U.S. PATENT DOCUMENTS 4,910,622  3/1990  Saito et al. .................................. 369/13

FOREIGN PATENT DOCUMENTS 175948  8/1987  Japan .

Primary Examiner—Paul J. Thibodeau
Assistant Examiner—R. Follett
Attorney, Agent, or Firm—Antonelli, Terry, Stout & Kraus

[57] ABSTRACT

A magneto-optical recording medium comprising, on a substrate, at least a first magnetic layer made of a rare earth amorphous alloy and a second magnetic layer made of a rare earth amorphous alloy having a relatively smaller coercivity $Hc_2$ than that of the first magnetic layer, wherein the following relationship is satisfied at an operation temperature:

$$Hw_1 - Hexc_1 > Hc_2 - Hexc_2$$

where $Hw_1$ represents the magnetic domain wall coercivity of the first magnetic layer, $Hexc_1$ represents the magnitude of the exchange magnetic field exerted on the first magnetic field and $Hexc_2$ represents the magnitude of the exchange magnetic field exerted on the second magnetic layer is used, to obtain a magneto-optical recording medium with no increase in the noises by overwriting, and without reduction of C/N ratio after repeating recording for a number of cycles, a recording method and overwriting method using the media and a magneto-optical recording device.

14 Claims, 15 Drawing Sheets

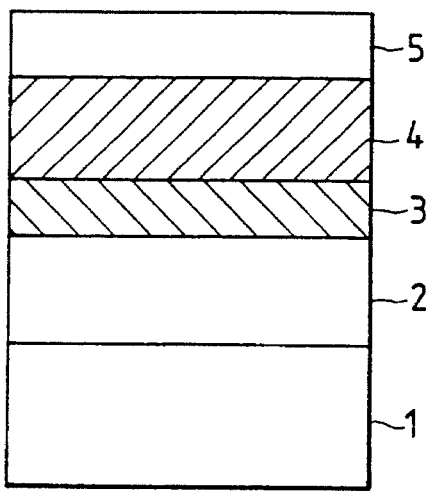
FIG. 1
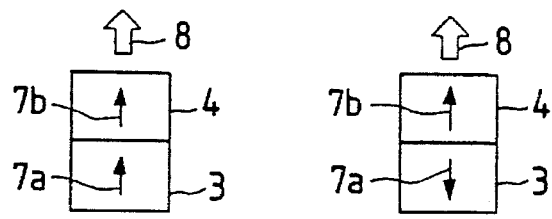
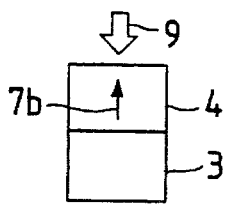
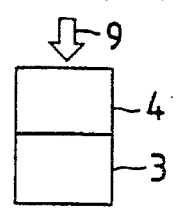
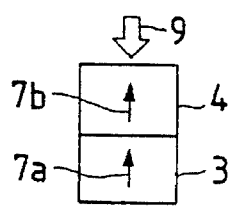
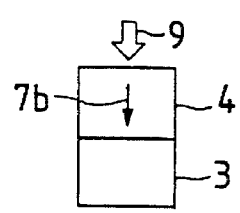
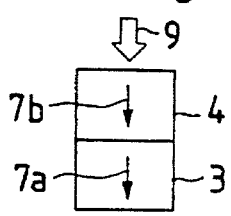
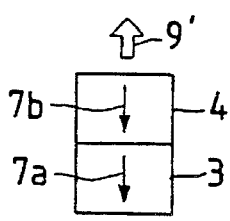

MAGNETO-OPTICAL RECORDING MEDIA AND MANGETO-OPTICAL DEVICE USING THE MEDIA

BACKGROUND OF THE INVENTION

The present invention concerns magneto-optical recording media capable of overwriting by a single-beam, a recording method and an overwriting method, as well as an magneto-optical recording device using the media and, more in particular, it relates to magneto-optical recording media comprising a plurality of rare earth transition metal alloy magnetic layers, a recording method and an overwriting method as well as a magneto-optical recording device using the media.

Magneto-optical recording media having an exchange coupled magneto-optical bilayer in the prior art have been described in, for example, Japanese Patent Laid Open Sho No. 62-175948 and have a cross sectional structure as shown by a schematic view of FIG. 1. That is, on a transparent substrate 1 such as made of glass and provided with pre-grooves for tracking, are formed a dielectric layer 2 such as made of silicon nitride to a thickness of about 90 nm, a first magnetic layer 3 such as made of TbFeCo to a thickness of about 100 nm, a second magnetic layer 4 such as made of TbDyFeCo to a thickness of about 150 nm and a protection layer 5 such as made of silicon nitride to a thickness of about 200 nm being laminated in this order.

The dielectric layer 2 has a function of putting an incident laser beam on the side of the substrate 1 to multiple reflection at the inside of the layer and increasing the rotation of a polarization plane (Kerr rotation) caused in the first magnetic layer 3. The protection layer 5 has a function of protecting the first magnetic layer 3 and the second magnetic layer 4 against corrosion due to oxidation or the like. The second magnetic layer 4 is magnetically exchange-coupled with the first magnetic layer 3 and used for conducting single beam overwriting as described below.

Description will then be made to the principle of overwriting referring to FIG. 2. The Curie temperature ($Tc_1$) of the first magnetic layer 3 is made lower than the Curie temperature ($Tc_2$) of the second magnetic layer 4, and the coercivity of the second magnetic layer 4 is made smaller than that of the first magnetic layer 3. Accordingly, only the direction of magnetization 7b in the second magnetic layer 4 can be unified in one direction irrespective of magnetization direction 7a in the first magnetic layer 3 by merely applying an initializing magnetic field 8 which is greater than the coercivity in the second magnetic layer 4 and smaller than the coercivity in the first magnetic layer 3 by a permanent magnet or the like (FIG. 2(a), (b)).

When a laser beam of a relatively low intensity is irradiated to such a magneto-optical recording medium, since the temperature of the first magnetic layer 3 exceeds its Curie temperature, magnetization in the first magnetic layer 3 is eliminated (FIG. 2(c)), and the direction of the magnetization 7a in the first magnetic layer 3 is aligned with the direction of the magnetization 7b in the second magnetic layer 4 in the subsequent cooling (FIG. 2(e)). Further, when a laser beam of a relatively high intensity is irradiated, since the temperature of the second magnetic layer 4 exceeds its Curie temperature, magnetization in each of the first magnetic layer 3 and the second magnetic layer 4 is eliminated (FIG. 2(d)). Then, the direction of the magnetization 7b in the second magnetic layer 4 is aligned with the direction of a recording magnetic field 9 applied from the outside by a permanent magnet or like other means in the subsequent cooling, and the direction of the magnetization 7a in the first magnetic layer 3 is aligned with the direction of the magnetization 7b in the second magnetic layer 4 as the cooling proceeds further (FIG. 2(g)). Accordingly, by modulating the intensity of the laser beam, the direction of the magnetization 7a in the first magnetic layer 3 can be reversed optionally, making the single-beam overwriting possible.

Not-overwriting recording or erasing is also possible by using this magneto-optical recording medium. In this case, when recording is applied to an area in which information is not recorded (FIG. 2(a)), a laser beam of a relatively large intensity is irradiated without applying an initializing magnetic field to turn the state shown in FIG. 2(d) into that shown in FIG. 2(g). In the case of erasing, an erasing magnetic field 9' in the direction opposite to the recording magnetic field is applied as shown in FIG. 2(h) and then a laser beam of a relatively large intensity is irradiated to attain the state shown in FIG. 2(a).

SUMMARY OF THE INVENTION

The prior art as described above involves a problem of noises generated in the recording upon overwriting and reduction of a carrier to noise ratio (C/N) upon repeating overwriting for many cycles. FIG. shows recording characteristics upon conducting overwriting. Noises are increased greatly after overwriting as compared with noises in a not-recorded state or before recording. FIG. 3 also shows recording characteristics when not-overwriting recording is conducted. Increase of the noises in this case is extremely small. As can be seen from FIG. 3, noises are generated under the effect of the initializing magnetic field.

FIG. 4 shows the change of C/N when overwriting is conducted repeatingly over a number of cycles. C/N is remarkably low after recording for about 104 cycles. Change of C/N when not-overwriting recording and erasing are repeated is extremely small as shown in FIG. 4. As can be seen from the figure, reduction of C/N is also caused under the effect of the initializing magnetic field.

A first object of the present invention is to provide magneto-optical recording media capable of overwriting and having high quality and high durability, in which noises are not increased by an initializing magnetic field and C/N is less deteriorated even after the repeating of overwriting over a number of cycles.

A second object of the present invention is to provide an overwriting method using such magneto-optical media.

A third object of the present invention is to provide a magneto-optical recording device using such magneto-optical media.

A fourth object of the present invention is to provide magneto-optical media capable of remarkably reducing the initializing magnetic field.

A fifth object of the present invention is to provide a recording method for magneto-optical recording media of greatly reducing the initializing magnetic field.

A sixth object of the present invention is to provide a magneto-optical recording device of greatly reducing the initializing magnetic field.

DETAILED DESCRIPTION OF THE INVENTION

The first object of the present invention can be attained by:

(1) a magneto-optical recording medium comprising at least a first magnetic layer made of a rare earth transition metal alloy and a second magnetic layer made of a rare earth transition metal alloy and having a relatively smaller coercivity $Hc_2$ in Oe than that of the first magnetic layer on a substrate, wherein the following relationship is satisfied at an operation temperature:

$$Hw_1 - Hexc_1 > Hc_2 - Hexc_2 \qquad (1)$$

where $Hw_1$ represents a magnetic domain wall coercivity of the first magnetic layer in Oe, $Hexc_1$ represents the magnitude of an exchange magnetic field exerting on the first magnetic layer in Oe and $Hexc_2$ represents the magnitude of an exchange magnetic field exerting on the second magnetic layer Oe, (2) a magneto-optical recording medium as defined in (1) above wherein $Hw_1$, $Hexc_1$, $Hc_2$ and $Hexc_2$ satisfy the following relationship at the operation temperature:

$$Hw_1 - Hexc_1 - (Hc_2 - Hexc_2) > 1 \text{ kOe} \qquad (2),$$

(3) a magneto-optical recording medium as defined in (2) above, wherein the first magnetic layer and the second magnetic layer contain a rare earth element and a transition metal, respectively, and magnetization of the rare earth element is dominant in the first and second magnetic layers at the operation temperature, or (4) a magneto-optical recording medium as defined in (1) or (2) above, wherein the first magnetic layer and the second magnetic layer contain a rare earth element and a transition metal element, respectively, and the magnetization of the transition metal element is dominant in the first and second magnetic layers at the operation temperature.

The second object of the present invention can be attained by:

(5) an overwriting method for a magneto-optical recording medium which comprises applying an initializing magnetic field to the magneto-optical recording medium as defined in (3) or (4) above to at least a portion of which information is recorded under the condition that $Hw_1$, $Hexc_1$ and $Hini$ Oe always satisfy the following relationship at an operation temperature:

$$Hw_1 - Hexc_1 > Hini \qquad (3)$$

where $Hini$ represents the magnitude of the initializing magnetic field for unifying only the magnetization in the second magnetic layer in one direction and a step of irradiating a light whose intensity is modulated into two or more values, to heat only the first magnetic layer to such a temperature as eliminating its magnetization or to heat both of the first and the second magnetic layers to such a temperature as eliminating their magnetization, thereby recording information, or (6) an overwriting method for a magneto-optical recording medium as defined in (5) above, wherein the initializing magnetic field is applied under the condition that $Hw_1$, $Hexc_1$ and $Hini$ satisfy the following relationship at the operation temperature:

$$Hw_1 - Hexc_1 Hini > 2 \text{ kOe} \qquad (4)$$

The third object of the present invention can be attained by:

(7) a magneto-optical recording device comprising means for holding the magneto-optical recording medium as defined in any one of (1) to (4) above, means for applying an initializing magnetic field for unifying only the magnetization in the second magnetic layer of the magneto-optical recording medium in one direction and means for irradiating a light whose intensity is modulated into two or more values.

The magnetic domain wall coercivity $Hw_1$ means the magnitude of the minimum magnetic field at which the magnetic domain wall recorded in the first magnetic layer 3 starts to move when a magnetic field is applied from the outside to the first magnetic layer 3. Accordingly, it is different from the coercivity defined with the magnitude of the magnetic field at which the magnetic reversion occurs. For instance, Japanese Patent Laid-Open Sho No. 62-175948 shows an example satisfying the following relationship:

$$Hw_1 - Hexc_1 > Hc_2 - Hexc_2 \qquad (5)$$

where $Hc_1$ represents the coercivity of the first magnetic layer 3. However, in view of the condition for the stability of the recorded magnetic domain, the condition in the present invention using the magnetic domain wall coercivity $Hw_1$ defined by the minimum magnetic field at which the recorded magnetic domain wall starts to move has to be satisfied. Generally, the value for the magnetic domain wall coercivity is smaller than that of the coercivity and, accordingly, the condition of the present invention is severer than that in Japanese Patent Laid-Open Sho No. 62-175948.

The magnitude of the exchange magnetic field referred to herein is defined as a difference of energy between a state when the directions of magnetization in the first magnetic layer 3 and the second magnetic layer 4 are identical and state when they are opposed, which is divided by the sum of magnetization over the entire volume of the first magnetic layer 3 or the second magnetic layer 4, i.e., it is equal to the magnitude of the magnetic field required additionally when only the magnetization in the first magnetic layer or only the magnetization in the second magnetic layer 4 is reversed against the energy difference described above.

The difference between the magnetic domain coercivity of the first magnetic layer $Hw_2$ and the exchange magnetic field $Hexc_1$ exerting on the first magnetic layer ($Hw_2 - Hexc_2$) is determined as shown below.

(a) In a case where both of the first magnetic layer 3 and the second magnetic layer 4 are rare earth dominant or transition metal, it is determined based on the magnetic field at a point of inflection on a Kerr hysteresis curve of the layer as deposited as shown in FIG. 29(a).

(b) In a case where only one of first magnetic layer 3 or the second magnetic layer 4 is rare earth dominant, the difference is determined by using $Hw_1 + Hexc_1$ obtained from the point of inflection on the Kerr hysteresis curve of the layer as deposited and $Hexc_2$ obtained from the amount of shift of a minor loop of the second magnetic layer 4 as shown in FIG. 29(b) and, in accordance with the equation:

$$Hexc_1 = Hexc_2 \cdot M_2 \cdot h_2 / (M_1 \cdot h_1)$$

where $M_2$, and $h_2$ represent, respectively, the $M_1$ and $h_i$ represent, respectively, magnetization and the thickness of the second layer 4 and the magnetization and the thickness of the first magnetic layer 3.

Even if the recording medium according to the present invention is used, since an accumulation time during which the recording medium is exposed to a high temperature is increased upon conducting overwrite recording repeatingly, magnetic characteristics of the recording medium are changed. Specifically, the coercivity and the magnetic domain wall coercivity of the recording medium are reduced. Accordingly, it is desirable to previously constitute a recording medium having the following condition in order to ensure the stability for the recorded magnetic domain even after the change of the magnetic characteristics caused by repeating overwriting.

An magneto-optical recording medium in which $Hw_1$, $Hexc_1$, $Hc_2$, $Hexc_2$ can always satisfy the following relationship at an operation temperature of 5° C. to 50° C:

$$Hw_1-Hexc_1-(Hc_2-Hexc_2)>2 \text{ kOe} \quad (2),$$

or an overwriting method in which $Hw_1$, $Hexc_1$ and $Hini$ can always satisfy the following relationship at a temperature of 5° C. to 50+ C. in a case where both of the first magnetic layer 3 and the second magnetic layer 4 are in a rare earth element dominant composition or both of the first magnetic layer 3 and the second magnetic layer 4 are in a transition metal dominant composition:

$$Hw_1-Hexc_1-Hini>2 \text{ kOe} \quad (4)$$

The thickness of the first magnetic layer is preferably within a range from 10 nm to 100 nm, more preferably, within a range from 20 nm to 80 nm. The thickness of the second magnetic layer is preferably within range from 30 nm to 300 nm, more preferably, within a range from 50 nm to 150 nm. The dielectric layer is not always necessary but it is usually preferred to dispose the layer to a thickness within a range from 40 nm to 100 nm.

The fourth object of the present invention can be attained by:

(8) a magneto-optical recording medium comprising at least a bias layer having a perpendicular magnetic anisotropy on the magneto-optical recording medium as defined in (1)–(4) above, wherein the Curie temperature of the second magnetic layer is made higher than that of the first magnetic layer, the Curie temperature of the bias layer is made higher than that of the second magnetic layer and the coercivity of each of the first magnetic layer and the bias layer at a room temperature is made higher than that of the second magnetic layer, (9) a magneto-optical recording medium comprising at least a bias layer having a perpendicular magnetic anisotropy on the magneto-optical recording medium as defined in (1)–(4) above, wherein the first magnetic layer has a coercivity greater than an initializing magnetic field applied at a room temperature and a coercivity smaller than a bias magnetic field applied near the Curie temperature thereof, the second magnetic layer has such a coercivity that the magnetization thereof is unified in one direction by the initializing magnetic field applied at the room temperature, and the bias layer has a coercivity whose magnetization is not reversed even by the initializing magnetic field and the bias magnetic field applied thereto,

(10) a magneto-optical recording medium as defined in (8) or (9) above, wherein a dielectric layer is disposed to at least one surface of the magnetic layer,

(11) a magneto-optical recording medium as defined in any one of (8) and (10) above, wherein the first magnetic layer has a thickness within a range from 200 Å to 600 ÅA,

(12) magneto-optical recording media as defined in any one of (8) and (11) above, wherein the Curie temperature of the first magnetic layer is within a range from 100° C. to 250° C.,

(13) magneto-optical recording media as defined in any one of (8) and (12) above, wherein the Curie temperature of the second magnetic layer is within a range from 150° C. to 300° C.,

(14) magneto-optical recording media as defined in any one of (8) and (13) above, wherein the Curie temperature of the bias layer is within a range from 250° C. to 450° C.,

(15) a method of recording a magneto-optical recording medium comprising at least a bias layer having a perpendicular magnetic anisotropy disposed on a magneto-optical recording medium as defined in any one of (1)–(4) above, wherein the method comprises:

(i) applying to the medium at a room temperature an initializing magnetic field smaller than the coercivity of any of the first magnetic layer and the bias layer and greater than the coercivity of the second magnetic layer and then, (ii) applying a bias magnetic field greater than the coercivity of the second magnetic layer and smaller than the coercivity of the bias layer near the Curie temperature of the second magnetic layer, and greater than the coercivity of the first magnetic layer and smaller than the coercivity of any of the first magnetic layer and the bias layer near the Curie temperature of the first magnetic layer and irradiating a modulated laser beam, or

(16) a method of recording a magneto-optical recording medium as defined in (14) above, wherein the bias magnetic field is applied as a magnetic field within a range from 0.5 to 2 kOe.

The third object of the present invention can be attained by:

(17) a magneto-optical recording device comprising means for holding a magneto-optical recording medium, an optical head for irradiating the magneto-optical recording medium, a moving means for changing a relative position between the magneto-optical recording medium and the optical head, means for applying an initializing magnetic field, means for applying a bias magnetic field and a control means for recording information under control of the optical head, wherein the means for applying the bias magnetic field is a means for applying a magnetic field within a range from 0.5 to 2 kOe.

In the present invention, the magnetic layer is composed of three layers which are arranged as a first magnetic layer, a second magnetic layer and a bias layer from the side of an incident light. It is generally preferred to arrange in the order of the first magnetic layer, the second magnetic layer and the bias layer from the side nearer to the substrate.

Any of the first magnetic layer, the second magnetic layer and the bias layer in the magnetic layer is preferably made of a material represented by the general formula:

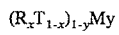

where R represents one or more of rare earth elements, T represents one or more of elements selected from Fe, Co and Ni, M represents Fe, Co or Ni, as well as transition metal elements other than the rare earth element, x and y each ranging as $0.1 \leq x \leq 0.4$ and $0 \leq y \leq 0.2$.

For instance, it is preferred to use Tb-Fe, Tb-Fe-Co, Tb-Dy-Fe-Co, Gd-Tb-Fe or any of the abovementioned alloys incorporated with at least one of Cu, W, Ti, V, Cr, Sn, Pb, Mo, Nb, Pt, Pd and Rh each in a small amount.

Since the first magnetic layer contributes to information recording and reproduction, its material composition is preferably determined so as to make the Kerr rotation angle greater. For this purpose, it is desirable to use a composition such as Tb-Fe-Co, Gd-Tb-Fe or Tb-Dy-Fe-Co.

Since the direction of magnetization has to be reversed easily by the initializing magnetic field in the second magnetic layer, it is preferable to determine the material composition therefor so as to have a relatively small coercivity at a room temperature. For this purpose, it is preferred to use, for example, Tb-Dy-Fe-Co, Gd-Dy-Fe-Co and Gd-Tb-Fe or any one of such alloys incorporated with a small amount of Sn, Pb, etc.

Further, for the bias layer, a composition such as Tb-Fe-Co, Tb-Co or Gd-Tb-Co is used. Particularly, for making the coercivity at a room temperature greater, it is preferred to use a composition of making a compensation temperature higher than the room temperature.

The thickness of the first magnetic layer is preferably within a range from 200 Å to 600 Å, the thickness of the second magnetic layer is preferably within a range from 500 Å to 2000 Å and the thickness of the bias layer is preferably within a range from 800 Å to 2000 Å.

The Curie temperature of the first magnetic layer is preferably within a range from 100° C. to 250° C., the Curie temperature of the second magnetic layer is preferably within a range from 150° C. to 300° C. and the Curie temperature of bias layer is preferably within a range from 250° C. to 450° C.

As the substrate, polycarbonate, polymethyl methacrylate or similar other material is used. Further, a dielectric layer is preferably disposed on one or both surfaces of the tri-layered magnetic layer. As the dielectric layer, silicon nitride, aluminum nitride, silicon oxide, aluminum oxide or the like is used.

Description will now be made to the principle of the present invention with reference to FIG. 5 and FIG. 6. FIG. 5 shows a relationship between an externally applied magnetic field and an effective magnetic field exerting on the first magnetic layer 3 in a case where the first magnetic layer 3 is in a transition metal dominant composition, while the second magnetic layer 4 is in a rare earth element dominant composition. In the same manner, FIG. 6 shows a relationship between an externally applied magnetic field and an effective magnetic field exerting on the first magnetic layer 3 in a case where both of the first magnetic layer 3 and the second magnetic layer 4 are in a rare earth element dominant composition.

As has been described above, an initializing procedure is necessary for aligning only the magnetization in the second magnetic layer 4 in one direction in order to conduct overwriting. Accordingly, the magnetization in the first magnetic layer 3 has to be sufficiently stable enough to the application of the initializing magnetic field Hini upon initialization. In view of double side recording, it has to be considered that the direction of the initializing magnetic field is reversed between foreside recording and backside recording. Accordingly, stability to the application of the magnetic field within a range of ±Hini has to be taken into consideration. In magneto-optical recording medium capable of overwriting, exchange magnetic field is exerted between the first magnetic layer 3 and the second magnetic layer 4. Accordingly, an effective magnetic field Heff exerted on the first magnetic field 3 upon application of a magnetic field within range of ±Hini is a sum or difference between the externally applied magnetic field Hext and the exchange magnetic field $Hexc_1$ as:

$$Heff = Hext \pm Hexc_1 \quad (6)$$

Assuming the direction of the magnetic field exerting on the direction of reversing the first magnetic layer 3 as positive, the sign "±" in the above-mentioned equation takes a "+" value when a domain magnetic wall is present at the interface between the first magnetic layer 3 and the second magnetic layer 4 (when the transition metal moment in both of the layers are opposite to each other), while the sign "±" in the above-mentioned equation takes a "−" value when the magnetic wall domain is not present at the interface between the first magnetic layer 3 and the second magnetic layer 4 (when the transition metal moment in both of the layers are in the identical direction). When an effective magnetic field Heff exerted on the first magnetic layer 3 is estimated while considering that the direction of the transition metal moment and the direction of magnetization are identical in the transition metal dominant magnetic layer, while the direction of the transition metal moment and the direction of the magnetization are in opposite directions in the rare earth element dominant magnetic layer, relationships as shown in FIG. 5 and FIG. 6 are derived.

Accordingly, in FIG. 5, the greatest magnetic field Heff exerted on the first magnetic layer 3 takes a value at a point R:

$$Heff = Hc_2 - Hexc_2 + Hexc_1 \quad (7)$$

In order that the magnetic domain recorded in the first magnetic layer 3 is present stably under the condition, the magnetic domain wall coercivity $Hw_1$ of the first magnetic layer has to be greater than Heff described above:

$$Hw_1 - Hexc_1 > Hc_2 - Hexc_2 \quad (1)$$

Further, in FIG. 6, the greatest magnetic field Heff exerted on the first magnetic layer 3 takes a value at a point E:

$$Heff = Hini + Hexc_1 \quad (8)$$

In order that the magnetic domain recorded in the first magnetic layer 3 is present stably under the condition, the magnetic domain wall coercivity $Hw_1$ of the first magnetic layer has to be greater than Heff described above:

$$Hw_1 - Hexc_1 > Hini \quad (3)$$

In this case, since the initializing magnetic field can be applied at any of temperatures within the operation temperature range (5° C. to 50° C.) of a magneto-optical recording/reproducing device, the foregoing condition has always to be satisfied for at 5° C. to 50° C.

Then, description will be made to a reason why the initializing magnetic field is reduced in the magneto-optical recording media according to the present invention with reference to the drawings. The bias layer 75 is previously magnetized in one direction. FIG. 16 shows a state of magnetization just after $P_H$ light is irradiated to record "1" in a first magnetic layer 65. When $P_H$ light is irradiated as shown in FIG. 16(a), the medium temperature is elevated near the Curie temperature of the second magnetic layer 63. Since a bias magnetic field is applied in this case, magnetization 64 in the second magnetic layer 63 is turned to this direction. Since the Curie temperature of the bias layer 75 is sufficiently higher than the Curie temperature of the second magnetic layer 63, the magnetization has no effect of the bias magnetic field and the direction of magnetization 76 is left as it is. As shown in FIG. 16(b), when irradiation of $P_H$ light is terminated and the temperature of the first magnetic layer 65 and the second magnetic layer 63 are lowered to reach the Curie temperature of the first magnetic layer 65, magnetization 66 appears in the first magnetic layer 65. Since the first magnetic layer 65 is exchange-coupled with the second magnetic layer 63, the direction of the magnetization 66 in the first magnetic layer 65 is aligned with the direction of the magnetization 64 in the second magnetic layer 63. As a result, since the directions of the magnetization in the second magnetic layer 63 and the first magnetic layer 65 are in antiparallel with each other, an interface magnetic wall domain wall 77 develops.

Subsequently, the magnetization 64 in the second magnetic layer 63 is reversed by the initializing magnetic field 67. FIG. 17 shows a state of the magnetization after initialization. An interface magnetic domain wall 77 is formed at the interface between the first magnetic layer 65 and the second magnetic layer 63. Accordingly, reversion of the magnetization in the second magnetic layer 63 is caused by the movement of the interface magnetic domain wall present so far between the second magnetic layer 63 and the bias layer 75 toward the first magnetic layer 65. The reversion of the magnetization by the movement of the magnetic domain wall is caused at about one-half coercivity of the second magnetic layer alone. Accordingly, the external magnetic field for starting the movement of the interface magnetic domain wall can be reduced to less than 2 kOe by reducing the coercivity of the second magnetic layer to less than 4 kOe.

On the other hand, FIG. 18 shows a state of magnetization just after the irradiation of $P_L$ light to record "0" in the first magnetic layer 65. As shown in FIG. 18(a), when the $P_L$ light is irradiated, the medium temperature is elevated near the Curie temperature of the first magnetic layer 5. Since the coercivity of the second magnetic layer 3 is greater than the bias magnetic field 68 near the temperature, magnetization 64 in the second magnetic layer 63 is not reversed. Since the coercivity of the bias layer 75 by the magnetization is also greater than the bias magnetic field 68, the magnetization is neither reversed. When the irradiation of the laser light is terminated and the magnetic film is cooled, since the magnetization 66 in the first magnetic layer 65 has an exchange field greater than the bias magnetic field 68 with respect to the magnetization 64 in the second magnetic layer 63, as shown in FIG. 18(b), the magnetization 66 in the first magnetic layer is also turned in the direction opposite to that of the bias magnetic field 68.

BRIEF DESCRIPTION OF THE DRAWINGS

FIG. 1 is a cross-sectioned vertical view of a magneto-optical recording medium in the prior art;

FIGS. 2(a)–2(h) are explanatory views for the principle of overwriting;

DETAILED DESCRIPTION OF THE PREFERRED EMBODIMENTS

The present invention will now be described more specifically by way of its examples.

Example 1

Figure 3:
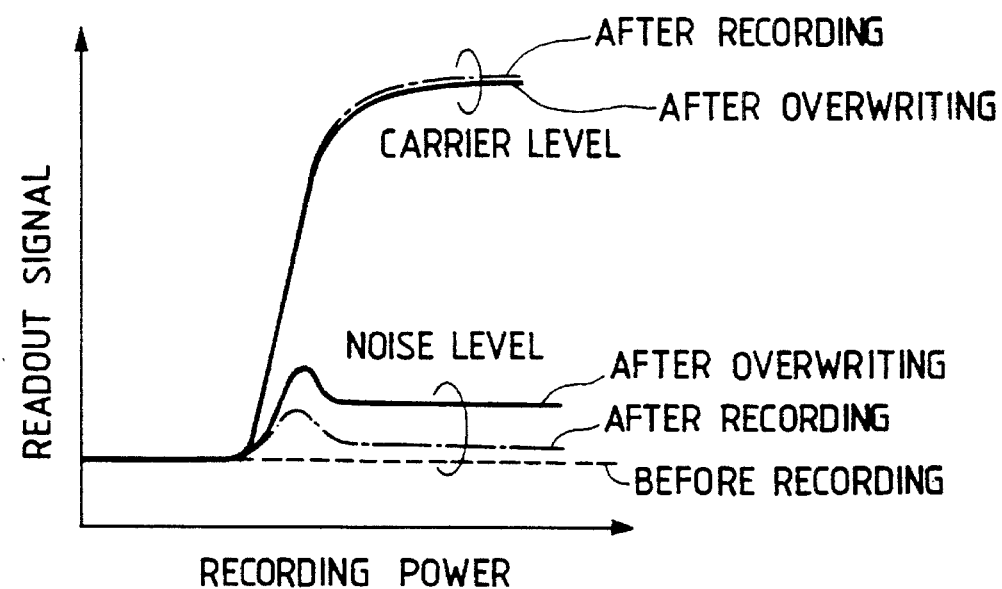
FIG. 3 is a view showing recording characteristics of a magneto-optical recording medium in the prior art.
Figure 4:
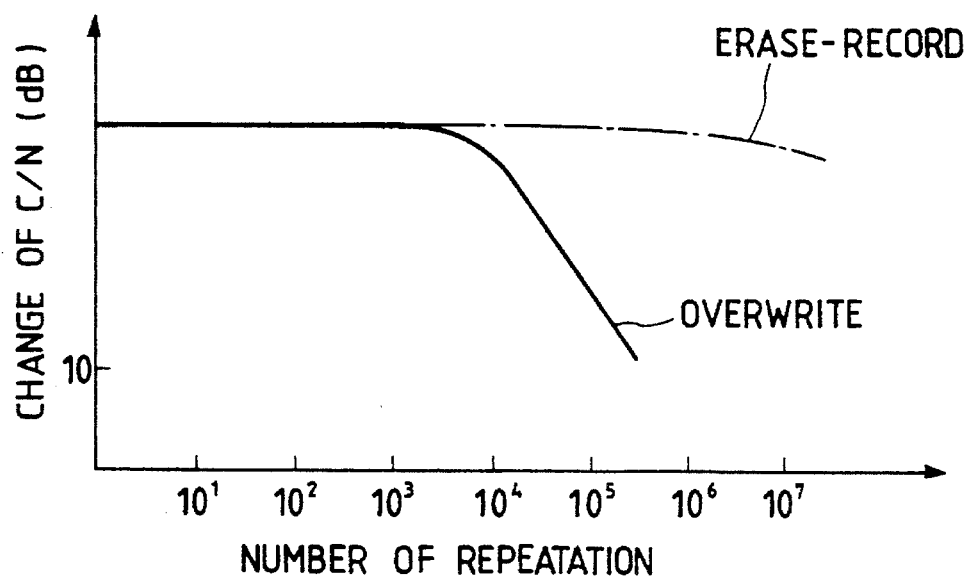
FIG. 4 is a view showing overwrite repeatability of a magneto-optical recording medium in the prior art.
Figure 5:
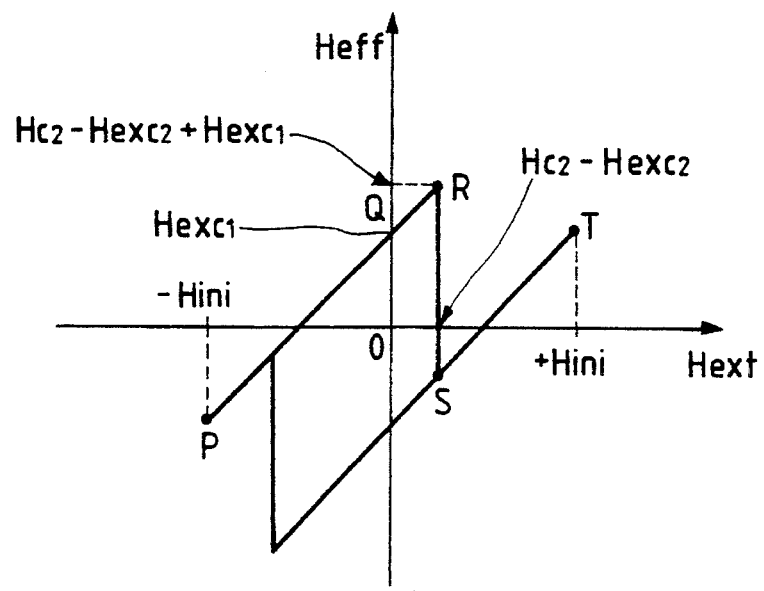
FIG. 5 is an explanatory view for the principle in the present invention.
Figure 6:
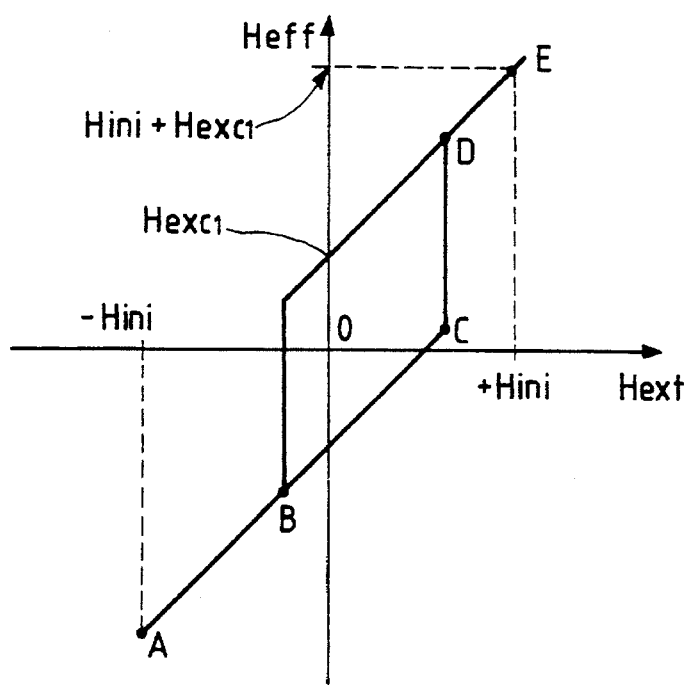
FIG. 6 is an explanatory view for the principle in the present invention.
Figure 7:
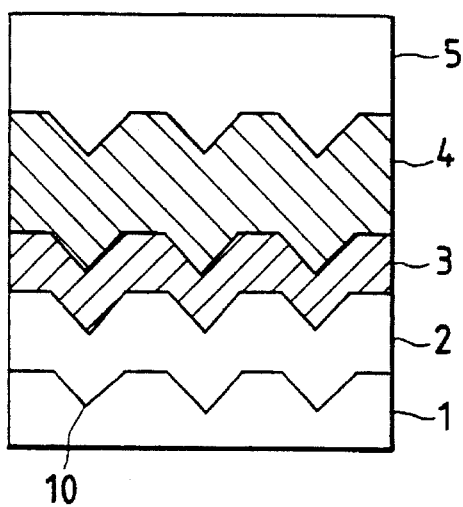
FIG. 7 is a cross-sectioned vertical view of a magneto-optical recording medium in one embodiment according to the present invention.

FIG. 7 is a cross-sectional vertical view of a recording medium in one embodiment according to the present invention. Description will be made to a preparation method. At first, a transparent substrate 1 of 5.25 inch diameter formed with tracking pre-grooves 10 was loaded in an RF-magnetron sputtering equipment and, after evacuating to lower than 0.1 mPa, a gas mixture of Ar and $N_2$ was introduced and reactive-sputtering was applied using Si as a target at a gas pressure of 1.3 Pa, to form $SiN_x$ to a thickness of 70 nm as a dielectric layer 2.

Subsequently, sputtering was applied using a TbFeCo alloy target at an Ar gas pressure of 0.7 Pa to form a transition metal dominant $Tb_{21}Fe_{61}Co_{18}$ amorphous alloy film to a thickness of 50 nm as a first magnetic layer 3. Then, a TbDyFeCo alloy target was sputtered also at an Ar gas pressure of 0.7 Pa to form a rare earth element dominant $Tb_{16}Dy_{16}Fe_{60}Co_8$ amorphous alloy film to a thickness of 100 nm as a second magnetic layer 4. The thus laminated first magnetic layer 3 and second magnetic layer 4 were magnetically exchange-coupled to each other. Then, after evacuating to lower than 0.1 mPa again, a gas mixture of Ar gas and $N_2$ was introduced and reactive-sputtering was applied using Si as a target to form $SiN_x$ to a thickness of 100 nm as a protection layer 5.

Figure 8:
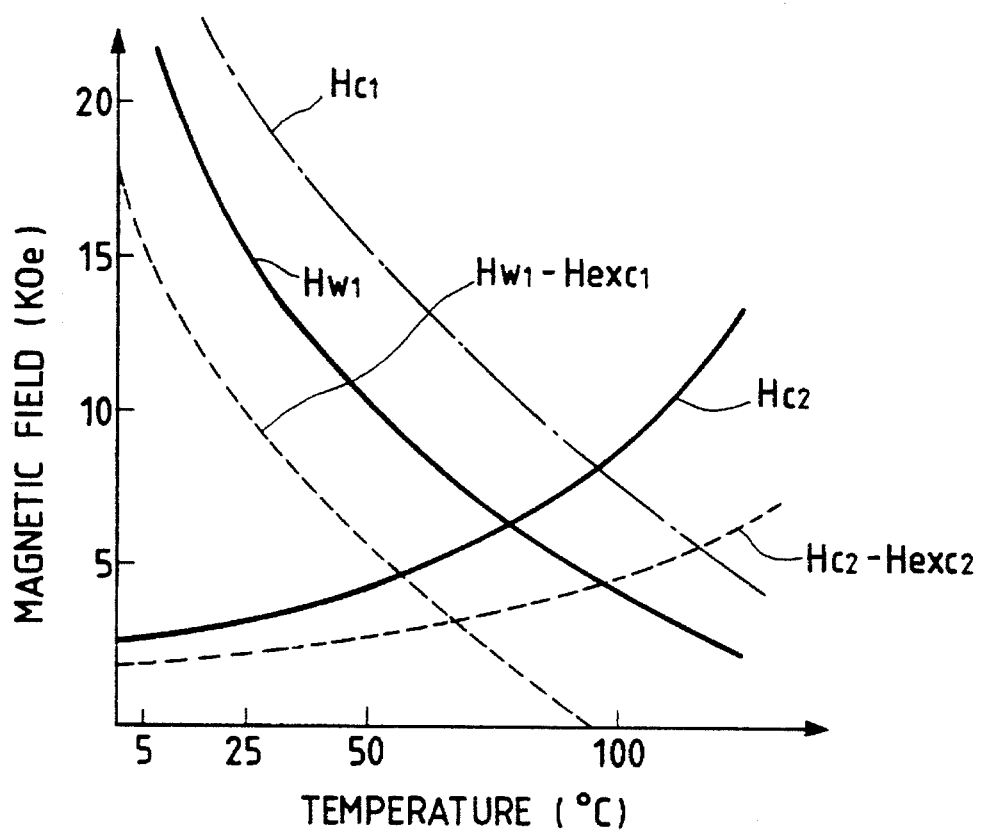
FIG. 8 is a view showing magnetic characteristics of a magneto-optical recording medium in one embodiment according to the present invention.

The temperature dependence of magnetic characteristics of the first magnetic layer 3 and the second magnetic layer 4 in this example are shown in FIG. 8. The first magnetic layer 3 is in a transition metal dominant composition, while the second magnetic layer 4 is in a rare earth element dominant composition. As can be seen in FIG. 8, the coercivity $Hc_2$ of the second magnetic layer 4 is 3 kOe, the coercivity $Hc_1$ of the first magnetic layer 3 is 20 kOe and the magnetic domain wall coercivity $Hw_1$ of the first magnetic layer 3 is 15 kOe at a room temperature of 25° C. Upon measuring the magnetic domain wall coercivity $Hw_1$, a specimen laminating only the first magnetic layer 3 on the transparent substrate 1 was prepared and a magnetic field at which a previously recorded magnetic domain wall started to move was measured. Further, the magnitude of the exchange-coupled magnetic field $Hexc_1$ exerted on the first magnetic layer 3 and the magnitude of the exchange-coupled magnetic field $Hexc_2$ exerted on the second magnetic layer 4 are 5 kOe and 1 kOe respectively. Accordingly, the following relationships are satisfied:

$$Hw_1-Hexc_1>Hc_2-Hexc_2 \quad (1)$$

and $$Hw_1-Hexc_1-(Hc_2-Hexc_2)>2 \text{ kOe} \quad (2)$$

As apparent from FIG. 8, the relationships are always satisfied within a range from 5° C. to 50° C.

Figure 9:
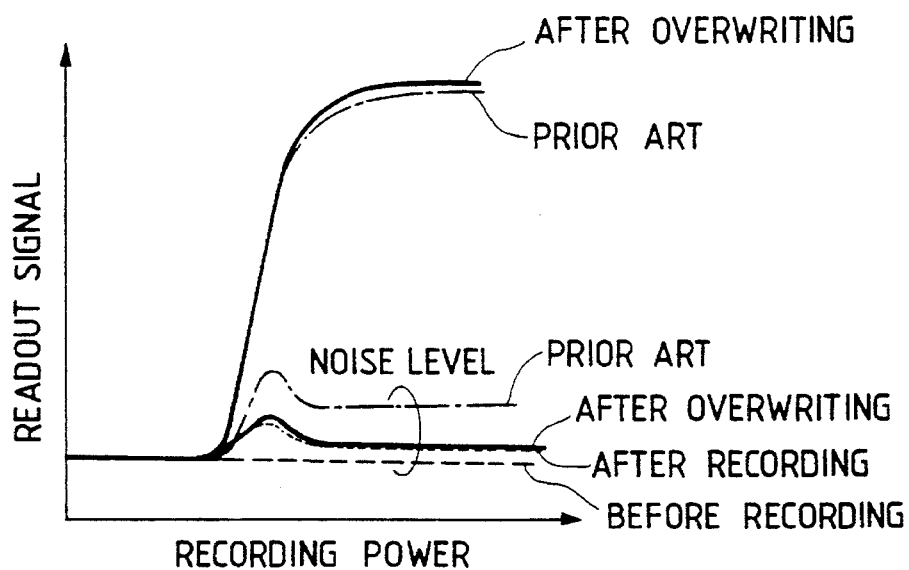
FIG. 9 is a view showing recording characteristics of a magneto-optical recording medium in one embodiment according to the present invention.

Recording characteristics were examined by using the magneto-optical recording medium of this example. A Sm-Co system permanent magnet at 5 kOe was used as an initializing magnetic field Hini. When overwriting recording was conducted at a recording mark length of 5 μm, C/N ratio at 59 dB was obtained. The recording characteristics are shown in FIG. 9. Further, recording characteristics upon conducting not-overwriting recording while removing the initializing magnetic field are also shown in FIG. 9. There was no change in C/N ratio between both of them.

Figure 10:
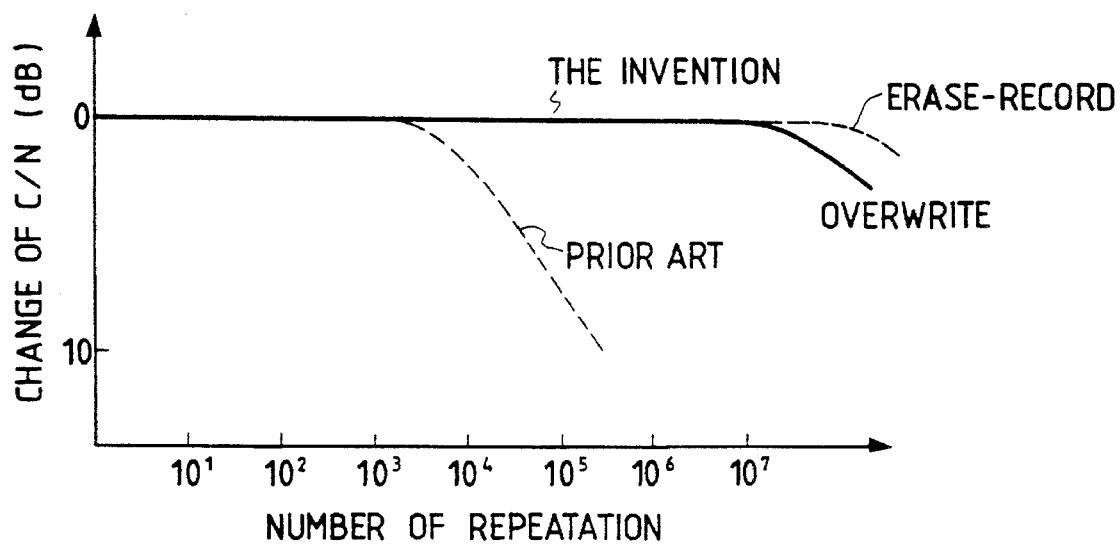
FIG. 10 is a view showing overwrite repeatability of a magneto-optical recording medium in one embodiment according to the present invention.

Further, when repeating overwriting recording test was conducted by using the magneto-optical recording medium of this example, there was no change in the C/N ratio even after overwriting for $10^7$ cycles as shown in FIG. 10. This is the same also when not-overwriting recording and erasing were conducted repeatingly.

Characteristics are shown for a medium prepared in the same method as in the magneto-optical medium in this example in which the exchange-coupled field between the first magnetic layer 3 and the second magnetic layer 4 was changed. The exchange-coupled field was controlled by laminating a nitride film of 0–5 nm thickness between the first magnetic layer 3 and the second magnetic layer 4. The nitride film was prepared by using the $Tb_{21}Fe_{61}Co_{18}$ target used for the first magnetic layer 3 and by conducting sputtering in a gas mixture of Ar and $N_2$. The target used for the second magnetic layer 4 or quite different other targets may also be used.

Figure 27:
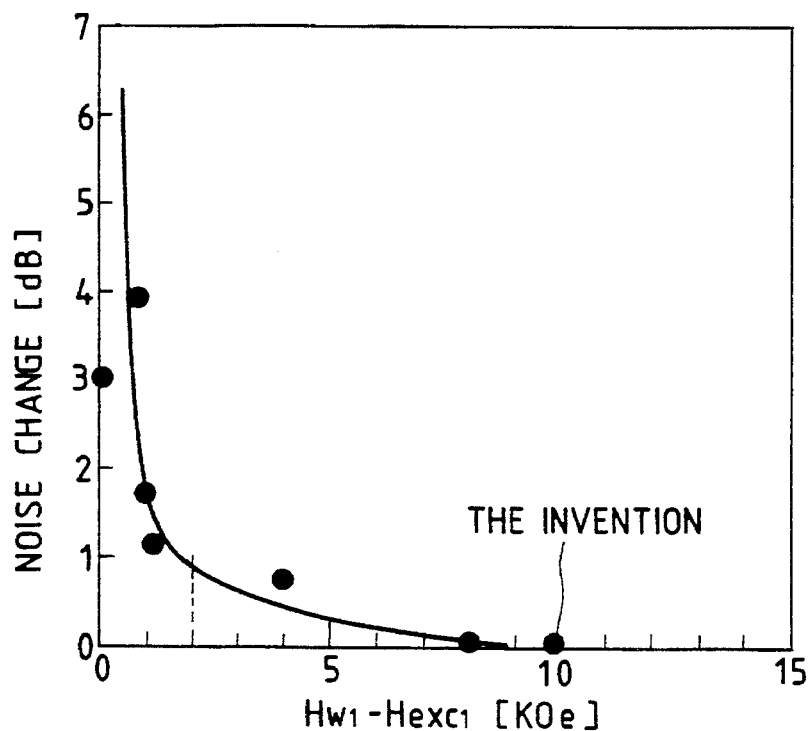
FIG. 27 is a diagram illustrating the effect of the present invention.

FIG. 27 shows the difference between the noise level when overwriting was conducted removing the initializing magnet and the noise level when usual overwriting recording was conducted. If $Hw_1-Hexc_1$ is greater than 2 kOe, the difference between the noise levels is less than 1 dB and satisfactory overwriting is attained.

Example 2

As shown in FIG. 7, at first, a transparent substrate 1 of 5.25 inch diameter formed with tracking pre-grooves 10 was loaded in an RF-magnetron sputtering equipment and, after evacuating to a high vacuum of lower than 0.1 mPa, a gas mixture of Ar and $N_2$ was introduced and reactive-sputtering was applied using Si as a target at a gas pressure of 1.3 Pa, to form $SiN_x$ to a thickness of 80 nm as a dielectric layer 2.

Subsequently, sputtering was applied using a TbFeCo alloy target at an Ar gas pressure of 0.7 Pa to form a $Tb_{28}Fe_{52}Co_{20}$ amorphous alloy film to a thickness of 22 nm as a first magnetic layer 3. Then, a TbDyFeCo alloy target was sputtered also at an Ar gas pressure of 0.7 Pa to form a $Tb_{17}Dy_{15}Fe_{60}Co_8$ amorphous alloy film to a thickness of 55 nm as a second magnetic layer 4. The thus laminated first magnetic layer 3 and the second magnetic layer 4 were magnetically exchange-coupled to each other. Then, after evacuating to lower than 0.1 mPa again, a gas mixture of Ar and $N_2$ was introduced and reactive-sputtering was applied using Si as a target to form $SiN_x$ to a thickness of 100 nm as a protection layer 5.

Figure 15:
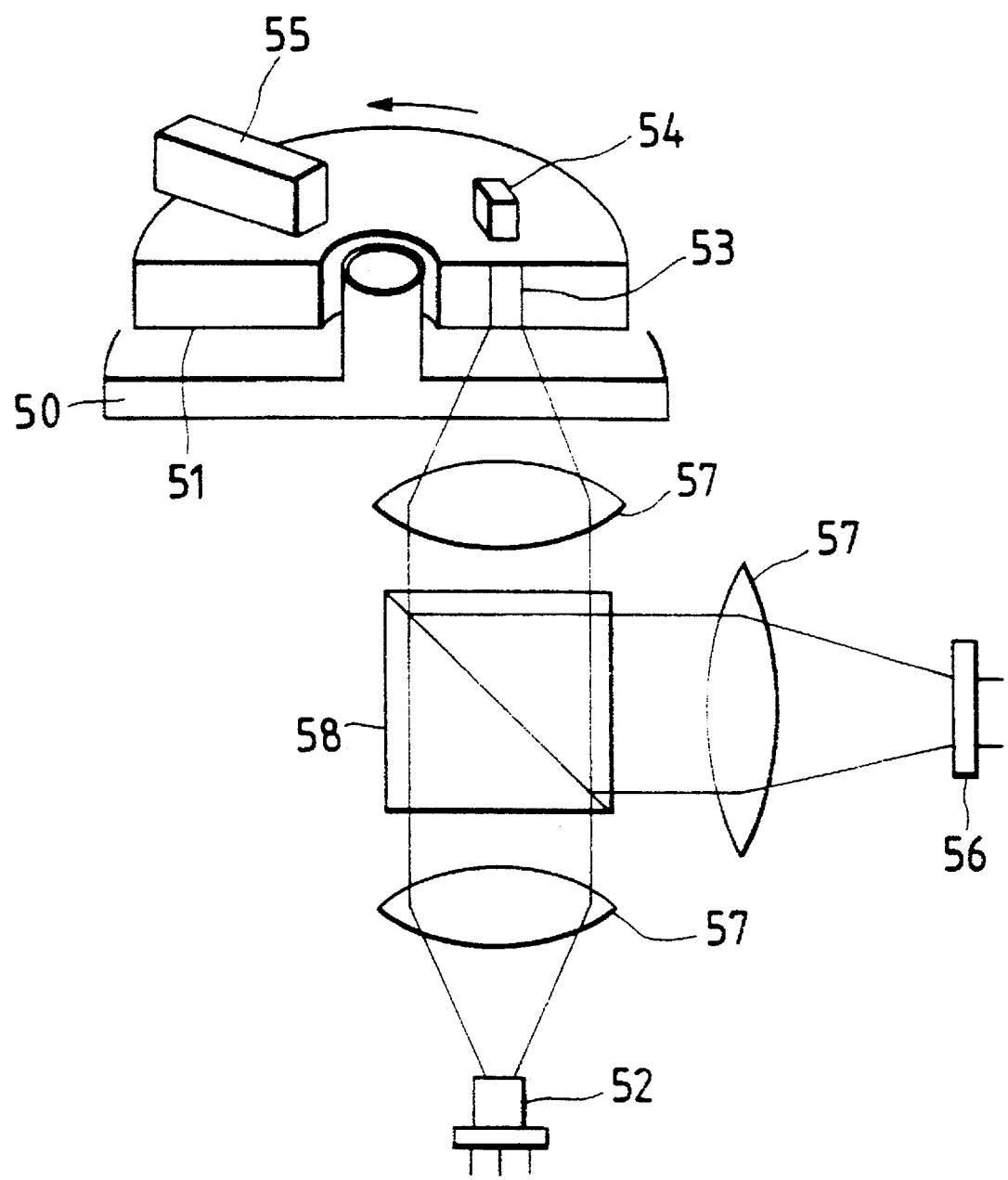
FIG. 15 is a constitutional diagram for a magneto-optical recording device of one embodiment according to the present invention.
Figures 16A, 16B:
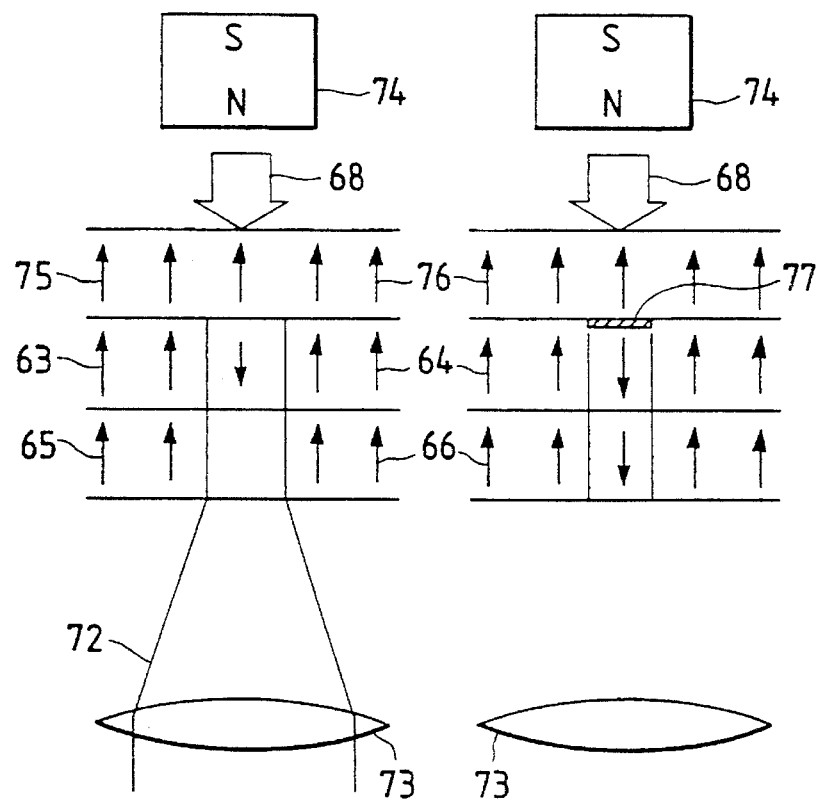
FIGS. 16(a) and 16(b) are explanatory views for the principle in the present invention.
Figure 17:
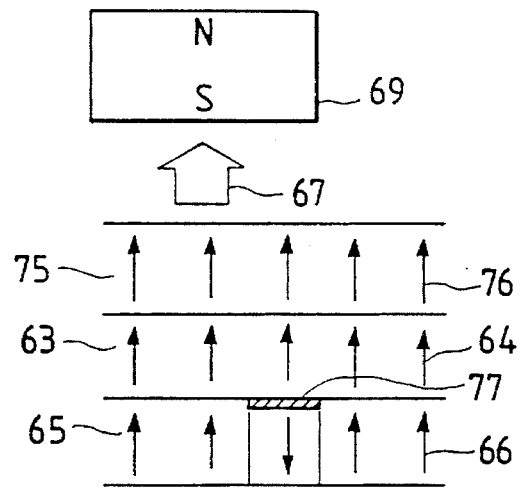
FIG. 17 is an explanatory view for the principle in the present invention.
Figures 18A, 18B:
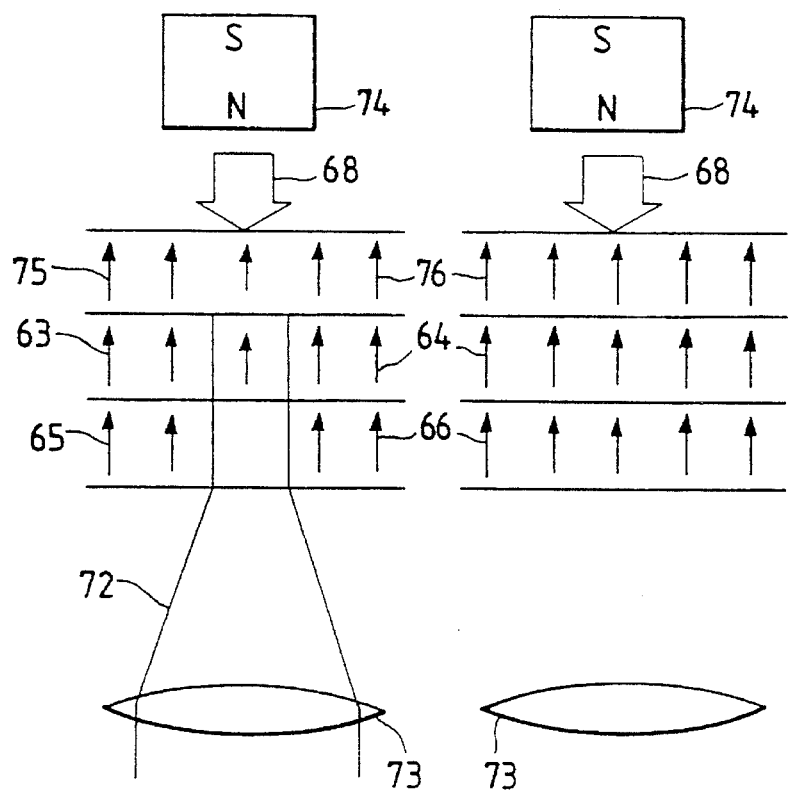
FIGS. 18(a) and 18(b) are explanatory views for the principle in the present invention.

Then, using a device shown in FIG. 15, overwriting recording was conducted to the recording medium 51 constituted as described above. A light emitted from a laser 52 was passed through a lens 57, a beam splitter 58 and then focussed through an objective lens 57 onto the recording medium 51 held by a holder 50, to form a light spot 53. A recording magnetic field was applied by a recording magnet 54 opposing the light spot 53. An initializing magnet 55 made of NdFeB was disposed to a portion different from that for the recording media 51, by which about 6 kOe of an initializing magnetic field was applied. Since the recording medium 51 was rotated, the intensity of the laser beam emitted from the laser 52 was modulated between high and low levels and, after overwriting, initialization was conducted automatically by the initializing magnetic field. When reproducing the recorded information, a reflection light from the light spot 53 was separated by the beam splitter 58 and the rotation of a polarization plane was detected by a detector 56 comprising a polarizer and a photodiode.

Figure 11:
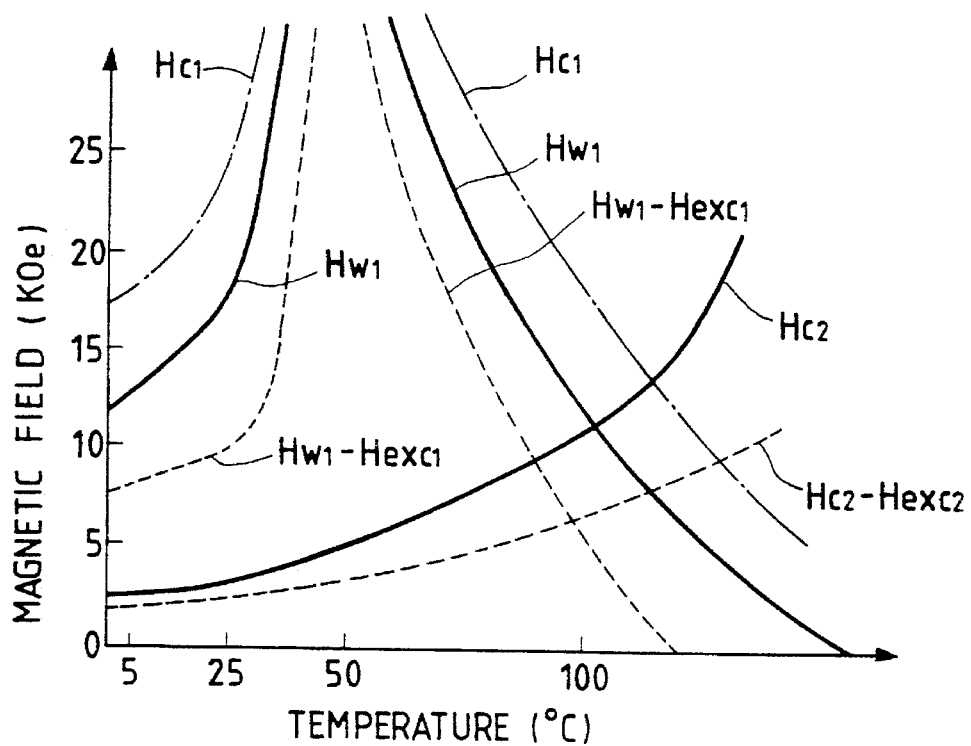
FIG. 11 is a view showing magnetic characteristics of a magneto-optical recording medium in one embodiment according to the present invention.

The temperature dependence of magnetic characteristics of the first magnetic layer 3 and the second magnetic layer 4 of the recording medium 51 in this example are shown in FIG. 11. The first magnetic layer 3 is in a rare earth element dominant composition, while the second magnetic layer 4 is also in a rare earth element dominant composition. As can be seen in FIG. 11, the coercivity $Hc_2$ of the second magnetic layer 4 is 3 kOe, the coercivity $Hc_1$ of the first magnetic layer 3 is 25 kOe and the magnetic domain wall coercivity $Hw_1$ of the first magnetic layer 3 is 18 kOe. Further, the magnitude for the exchange-coupled magnetic field $Hexc_1$ exerted on the first magnetic layer 3 and the magnitude of the exchange-coupled magnetic field $Hexc_2$ exerted on the second magnetic layer 4 are 8 kOe and 1 kOe respectively. Accordingly, the following relationship is satisfied:

$$Hw_1-Hexc_1>Hc_2-Hexc_2 \quad (1)$$

Further, since $Hw_1-Hexc_1=10$ kOe and the initializing magnetic field applied by the initializing magnet 55 is about 6 kOe, the following relationship is always satisfied between 5° C. and 50° C.:

$$Hw_1-Hexc_1-Hini>2 \text{ kOe} \quad (4)$$

Using the magneto-optical recording medium of this example, when the recording characteristics by overwriting at a recording mark length of 5 μm were examined, C/N ratio at 60 dB was obtained. Further, when not-overwriting recording was conducted moving the initializing magnetic field, there was no change in the C/N ratio.

Further, when repeating overwriting recording test was conducted by using the magneto-optical recording medium of this example, there was no changing in the C/N ratio after overwriting for $10^7$ cycles. This is the same also when not-overwriting recording and erasing were conducted repeatingly.

The similar results were also obtained in a case of using the transition metal dominant composition for the first magnetic layer 3 and the transition metal dominant composition also for the second magnetic layer 4 characteristics are shown for medium prepared in the same method as in the magneto-optical medium of this example in which the exchange-coupling force between the first magnetic layer 3 and the second magnetic layer 4 was changed. The exchange-coupling force was controlled in the same manner as in Example 1.

Figure 28:
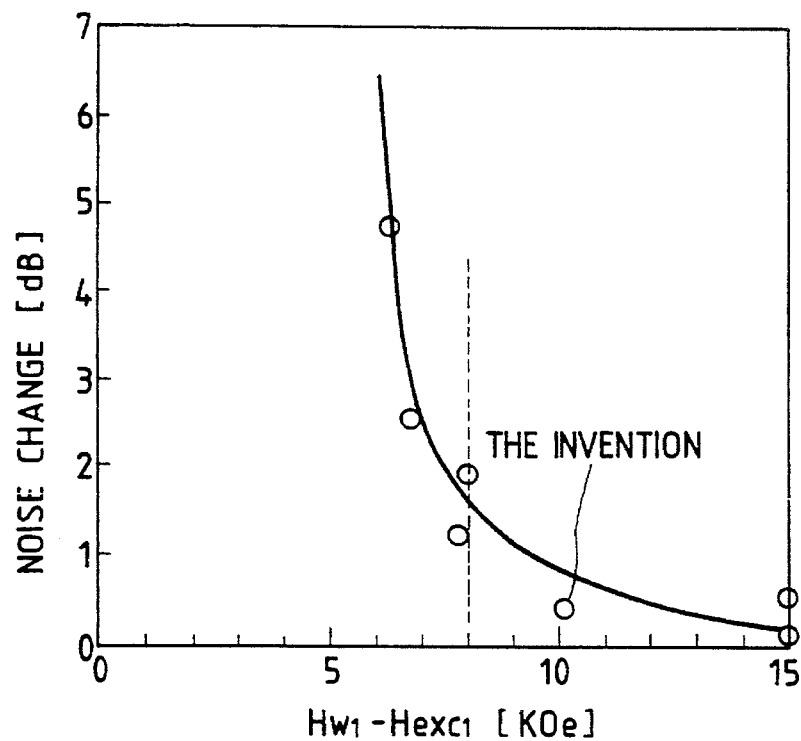
FIG. 28 is a diagram illustrating the effect of the present invention.
Figure 29A:
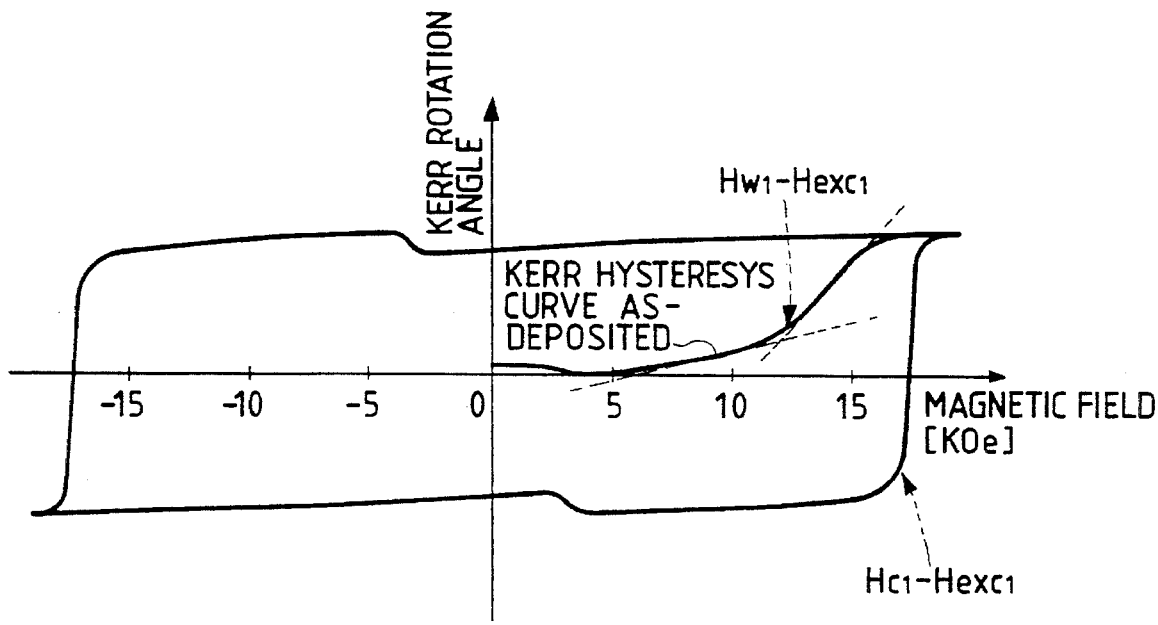
FIG. 29(a) and (b) are diagrams illustrating the method of measuring the magnetic domain wall coercivity.
Figure 29B:
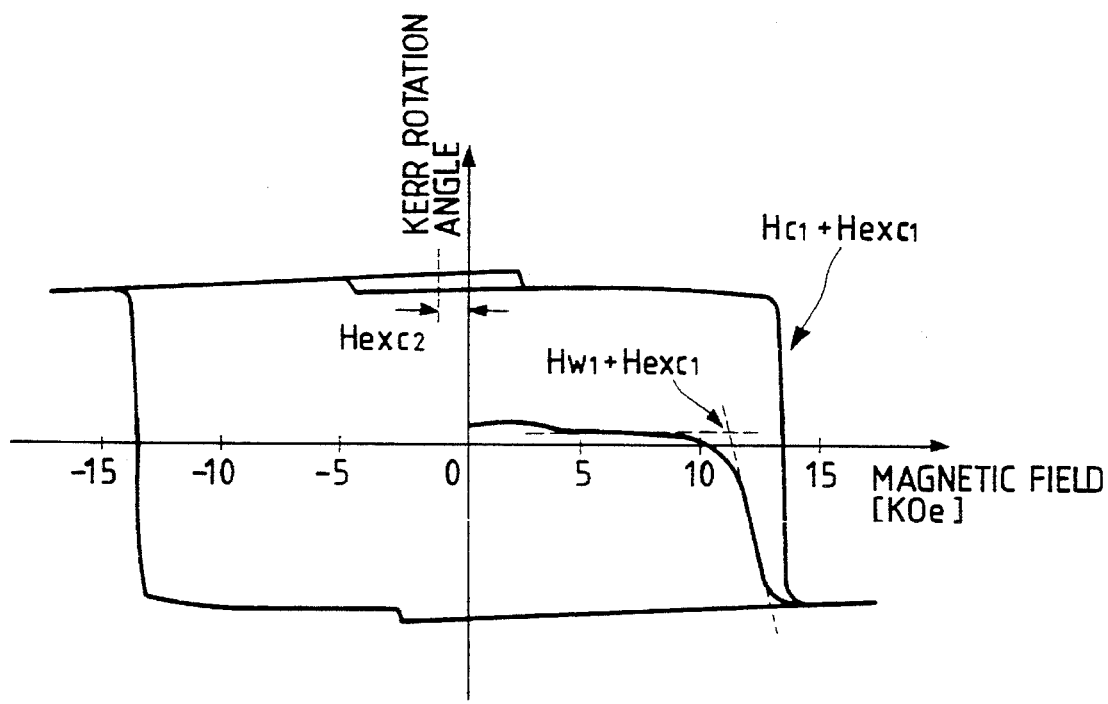

FIG. 28 shows the difference between the noise level when overwriting was conducted removing the initializing magnet and the noise level when usual overwriting recording was conducted. If $Hw_1-Hexc_1$ is greater than 8 kOe (initializing magnetic field 6 kOe+ 2 kOe), the difference between the noise levels is less than 1 dB and satisfactory overwriting is attained.

Example 3

Figure 12:
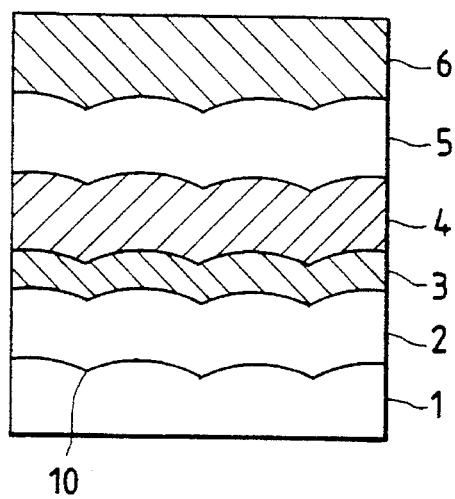
FIG. 12 is a cross-sectioned vertical view of a magneto-optical recording medium in one embodiment according to the present invention.

FIG. 12 is a cross-sectional vertical view of a recording medium in one embodiment according to the present invention. Description will be made to a preparation method. At first, a transparent substrate 1 of 5.25 inch diameter formed with tracking pre-grooves 10 was loaded in an RF-magnetron sputtering equipment and, after evacuating to lower than 0.1 mPa, a gas mixture of Ar and $N_2$ was introduced and reactive-sputtering was applied using Si as a target at a gas pressure of 1.3 Pa, to form $SiN_x$ to a thickness of 70 nm as a dielectric layer 2.

Subsequently, sputtering was applied using a TbFeCo alloy target at an Ar gas pressure of 0.7 Pa to form a $Tb_{22}Fe_{56}Co_{22}$ amorphous alloy film to a thickness of 20 nm as a first magnetic layer 3. Then, a TbDyFeCo alloy target was sputtered also at an Ar gas pressure of 0.7 Pa to form a $Tb_{20}Dy_{12}Fe_{58}Co_{10}$ amorphous alloy film to a thickness of 35 nm as a second magnetic layer 4. The thus laminated first magnetic layer 3 and the second magnetic layer 4 were magnetically exchange-coupled to each other. Then, after evacuating to lower than 0.1 mPa again, a gas mixture of Ar and $N_2$ was introduced and reactive-sputtering was applied using Si as a target to form $SiN_x$ to a thickness of 40 nm as a protection layer 5. Further, sputtering was applied using an AlTi alloy target at an Ar gas pressure of 0.7 Pa to form $AlTi_x$ to a thickness of 60 nm as a metal layer 6.

The metal layer 6 had a function as a reflection layer of increasing the Kerr rotation angle by optical interference and a function as a thermal diffusion layer of preventing the recording layer from being exposed to an extremely high temperature thereby improving the number of rewriting cycles together.

Figure 13:
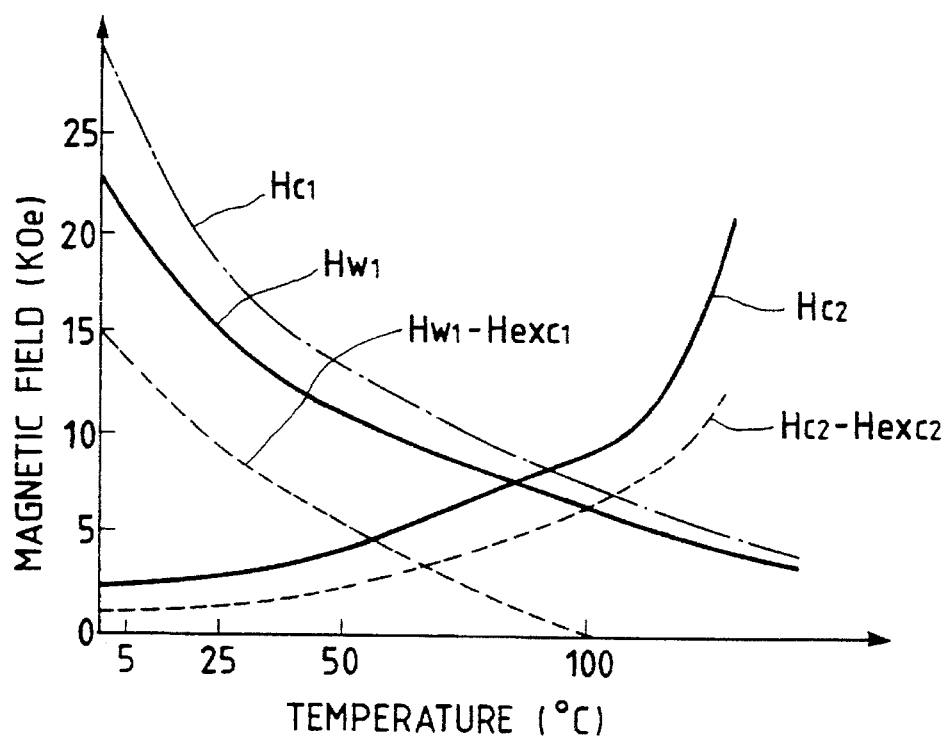
FIG. 13 is a view showing magnetic characteristics of a magneto-optical recording medium in one embodiment according to the present invention.

The temperature dependence of magnetic characteristics of the first magnetic layer 3 and the second magnetic layer 4 in this example are shown in FIG. 13. The first magnetic layer 3 is in a transition metal dominant composition, while the second magnetic layer 4 is in a rare earth element dominant composition. As can be seen in FIG. 13, the coercivity $Hc_2$ of the second magnetic layer 4 is 2.5 kOe, the coercivity $Hc_1$ of the first magnetic layer 3 is 18 kOe and the magnetic domain wall coercivity $Hw_1$ of the first magnetic layer 3 is 15 kOe at a room temperature of 25° C. Further, the magnitude for the exchange-coupled magnetic field $Hexc_1$ exerted on the first magnetic layer 3 and the magnitude of the exchange-coupled magnetic field $Hexc_2$ exerted on the second magnetic layer 4 are 6 kOe and 1.5 kOe respectively. Accordingly, the following relationships are satisfied:

$$Hw_1-Hexc_1>Hc_2-Hexc_2 \qquad (1)$$

and $$Hw_1-Hexc_1-(Hc_2-Hexc_2)>2 \text{ kOe} \qquad (2)$$

As apparent from FIG. 13, the relationships are always satisfied within a range from 5° C. to 50° C.

Figure 14:
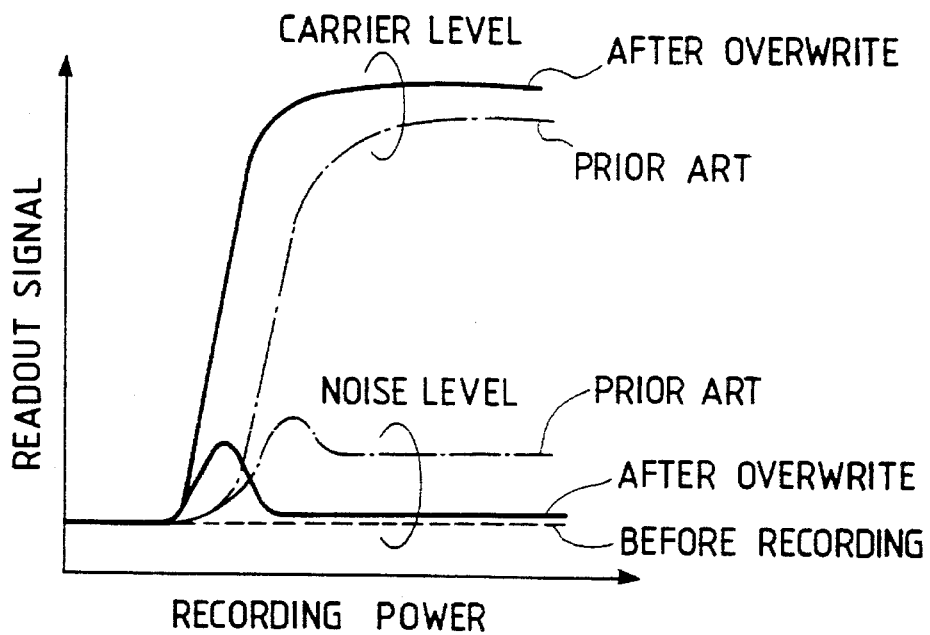
FIG. 14 is a view showing recording characteristics of magneto-optical recording media in one embodiment according to the present invention.

Recording characteristics were examined by using the magneto-optical recording medium of this example. An NdFeB system permanent magnet at 6 kOe was used as an initializing magnetic field Hini. When overwriting recording was conducted at a recording mark length of 5 μm, a C/N ratio at 61 dB was obtained. The recording characteristics are shown in FIG. 14. Further, when not-overwriting recording was conducted while removing the initializing magnetic field, there was no change in the C/N ratio.

Further, when repeating overwriting recording test was conducted by using the magneto-optical recording medium of this example, there was no change in the C/N ratio after overwriting for $10^7$ cycles. This is the same also when not-overwriting recording and erasing were conducted repeatingly.

Example 4

Figure 19:
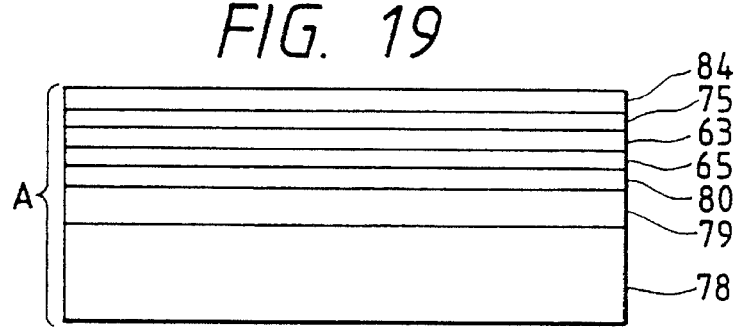
FIG. 19 is a cross-sectioned vertical view of magneto-optical recording medium in one embodiment according to the present invention.

As shown in FIG. 19, an ultraviolet curable resin layer 79 having grooves formed at a 1.6 μm pitch was disposed to a thickness of 30 μm on a disc-shaped glass substrate 78. On this layer, the following films were formed by sputtering. At first, a silicon nitride film 20 was formed to a thickness of 850 Å. Sputtering was conducted using silicon as a target and a gas mixture of Ar and $N_2$ as a sputtering gas and under a pressure of 10 mTorr. The refractive index of silicon nitride can be controlled by varying the mixing ratio of the nitrogen gas. In this example, the nitrogen gas mixing ratio was set to 8% so as to provide a refractive index of 2.1.

Then, there were formed a $Tb_{20}Fe_{72}Co_8$ film with a Curie temperature $T_2$ of 170° C. to a thickness of 400 Å as a first magnetic layer 65, a $Tb_{17}DY_{16}Fe_{50}Co_{17}$ film with a Curie temperature $T_3$ of 250° C. to a thickness of 500 Å as a second magnetic layer 3 and a $Tb_{25}Co_{70}$ film with a Curie temperature of 400° C. to a thickness of 1000 Å as a bias layer 75 respectively. A composite target comprising chips of Tb, Dy, Co, etc. disposed on a Fe plate was used as a target. An alloy target may also be used. Finally, a silicon nitride film 84 was formed to a thickness of 2000 Å for preventing oxidation and corrosion of the magnetic layer. In this way, a magneto-optical recording medium A according to the present invention was completed.

Figure 20:
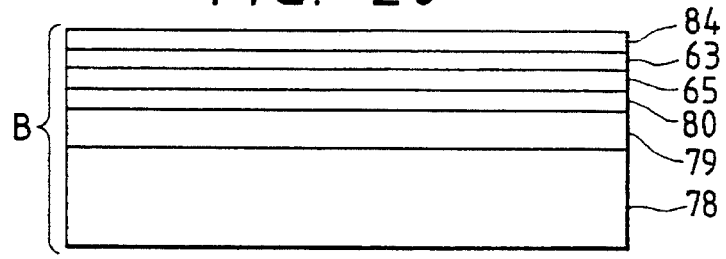
FIG. 20 is a cross-sectioned vertical view of a magneto-optical recording medium in the prior art.

For the comparison, a magneto-optical medium B having the same layer constitution and material except for not disposing the bias layer and changing the thickness of the film 63 to 1500 Å was also prepared (refer to FIG. 20). That is, an ultra-violet curable resin 79 having grooves formed at a 1.6 μm pitch was disposed to a thickness of 30 μm on a disc-shaped glass substrate 78 as shown in FIG. 20. On this layer, a silicon nitride film 80 was formed to a thickness of 850 Å by sputtering. Sputtering was conducted by using silicon as a target and a gas mixture of Ar and $N_2$ as a sputtering gas and under a pressure of 10 mTorr. In this case, the nitrogen gas mixing ratio was controlled to 8% so that the refractive index of the silicon nitride film was 2.1. Then, a $Tb_{20}Fe_{72}Co_8$ film was formed to a thickness of 400 Å as a first magnetic layer 65 and a $Tb_{17}Dy_{16}Fe_{50}Co_{17}$ film to a thickness of 1500 Å as a second magnetic layer 3. Finally, a silicon nitride film 84 was formed to a thickness of 2000 Å. In this way, the magneto-optical medium B in the prior art was completed.

Figure 25:
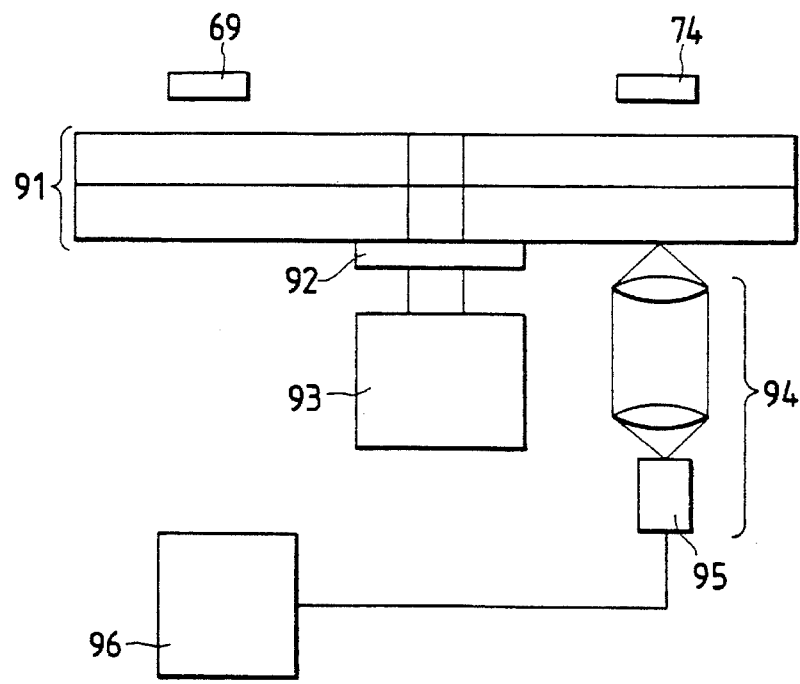
FIG. 25 is a cross-sectioned vertical view of a magneto-optical recording medium in one embodiment according to the present invention.

Signals were recorded to the thus completed two kinds of magneto-optical recording media using the magneto-optical recording device shown in FIG. 25. The magneto-optical recording media A and B were prepared each by two and two media were appended to each other with the film-forming surfaces being at the inside, to form a magneto-optical recording medium 91. The magneto-optical recording medium 91 was held by a holder 92, rotated by a motor 93 and irradiated with a laser beam from an optical head 94 comprising a laser diode semiconductor laser 95 at a wavelength of 830 nm and a lens with a number of aperture of 0.55. An initializing magnet field was applied from an initializing magnet 69, while a bias magnetic field was applied from a bias magnet 74 to the magneto-optical recording medium 91. A controller 96 was used for controlling information.

Figure 21:
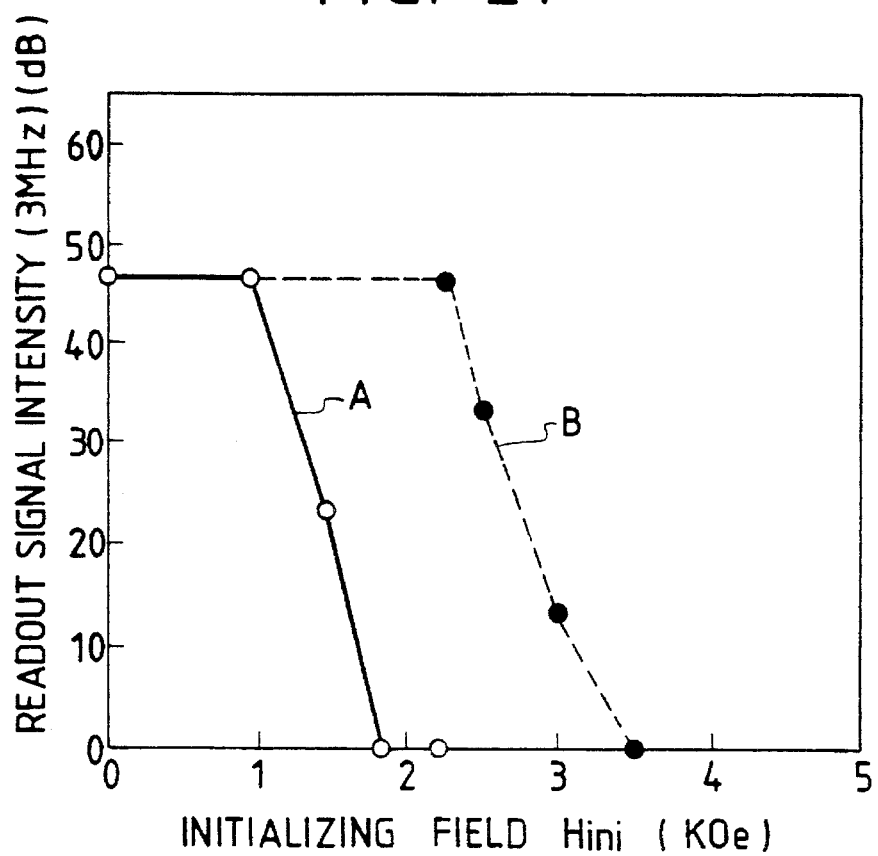
FIG. 21 is a diagram illustrating erasing characteristics.
Figure 26:
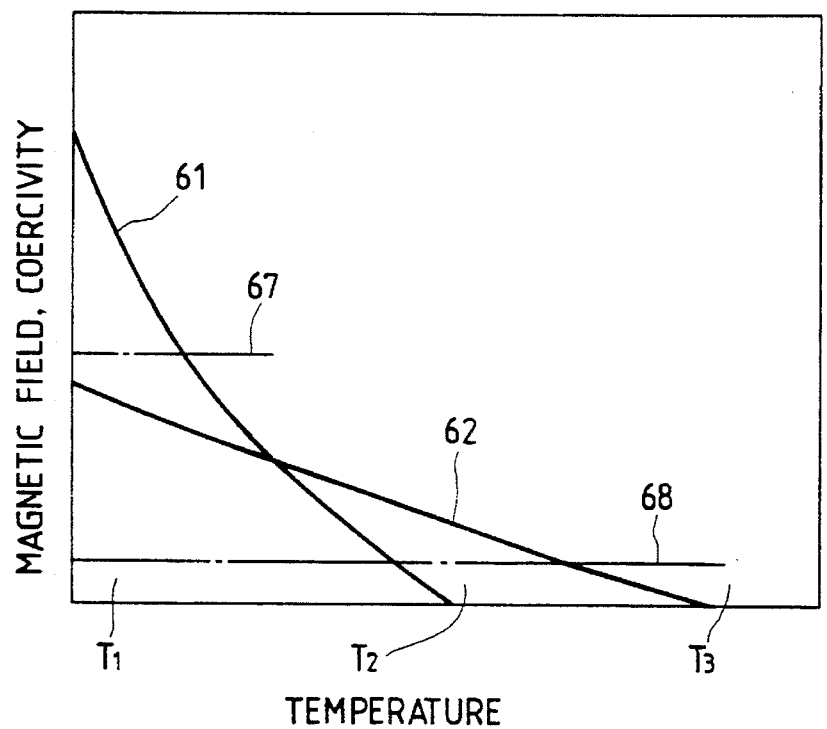
FIG. 26 is a view showing magnetic characteristics of a magneto-optical recording medium in one embodiment according to the present invention.

For recording information, the magneto-optical recording medium was rotated at a speed of 2400 rpm and 3 MHz signals were recorded, while setting a recording power $P_H$ to 11 mW and an erasing power $P_L$ to 6 mW, at the innermost circumference of the recording region (30 mm radius). Subsequently, 5 MHz signals were recorded at an identical recording power and an erasing power. In this case, when the output of the 3 MHz signals left after erasing was measured by using the magnitude of the initializing magnetic field as a parameter, the 3 MHz signals were completely erased at 1.8 kOe in the magneto-optical recording medium A as shown in FIG. 21. While on the other hand, the 3 MHz signals were erased only after applying the initializing magnetic field at 3.5 kOe in the magneto-optical recording medium B. For the first magnetic layer and the second magnetic layer of the magneto-optical recording medium, the relationship between the Curie temperature and the coercivity, the initializing magnetic field and the bias magnetic field is as shown in FIG. 26.

Example 5

Figure 22:
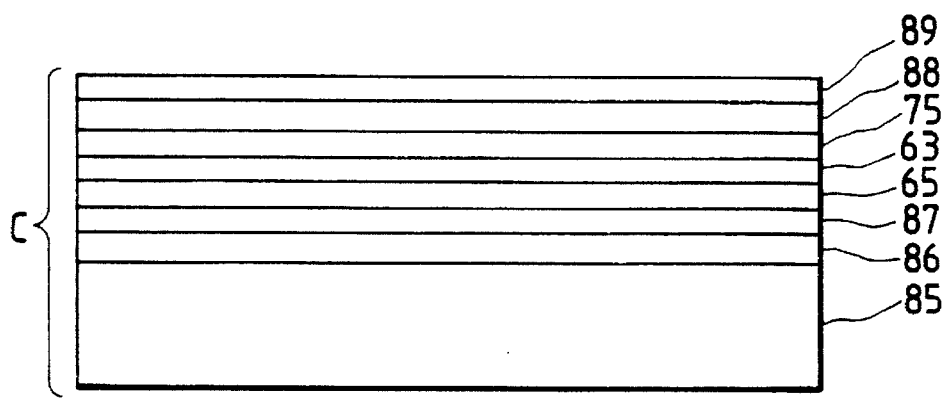
FIG. 22 is a cross-sectioned vertical view of a magneto-optical recording medium in another embodiment according to the present invention.

As shown FIG. 22, on a polycarbonate substrate 85 of 3.5 inch diameter having tracks at 1.4 μm pitch, the following films were formed by sputtering.

At first, after sputter-etching the polycarbonate substrate 85 in vacuum, a silicon dioxide film 86 was formed to a thickness of about 50 Å. Subsequently, sputtering was conducted by using a sintered tantalum oxide target and using a gas mixture of Ar and $N_2$ as a sputtering gas, at a pressure of 10 mTorr, to form a tantalum oxide film 87 to a thickness of 800 Å. Then, sputtering was conducted by using an alloy target made of TbFeCoCr under a gas pressure of 10 mTorr to form a $Tb_{22}Fe_{64}Co_{10}Cr_4$ film with a Curie temperature of 180° C. to a thickness of 300 Å as a first magnetic layer 65. Further, sputtering was conducted by using a GdTbFeCo alloy target under a gas pressure of 5 mTorr to form a $Gd_{25}Tb_5Fe_{50}Co_{20}$ film with a Curie temperature of 280° C. to a thickness of 700 Å as a second magnetic layer 3. Finally, sputtering was conducted by using an alloy target comprising TbDyCo under a gas pressure of 10 mTorr, to form a $Tb_{20}Dy_3Co_{77}$ film with a Curie temperature of 330° C. to a thickness of 1000 Å as a bias layer 75. Subsequently, a tantalum oxide film 88 was formed to a thickness of 200 Å. Finally, an Al-Ti alloy film 89 was formed to a thickness of 300 Å. In this way, the magneto-optical recording medium C according to the present invention was obtained.

Figure 23:
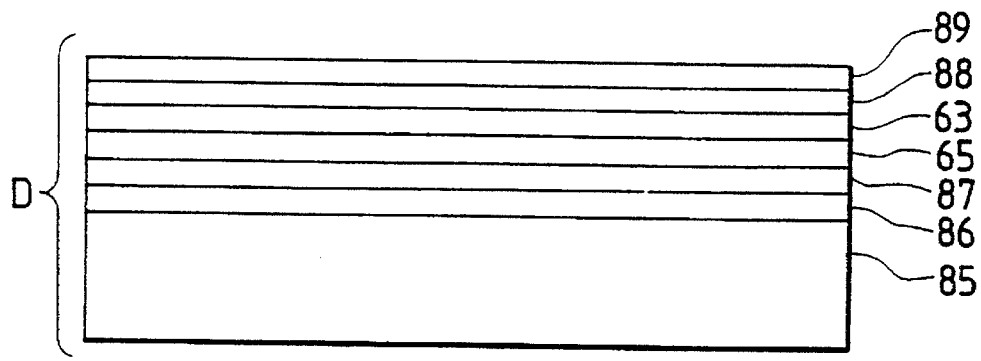
FIG. 23 is a cross-sectioned vertical view of magneto-optical recording medium in the prior art.

On the other hand, for the comparison, a magneto-optical recording medium D in the prior art as shown in FIG. 23 was also prepared by the following procedures. That is, after sputter-etching polycarbonate substrate 85 in vacuum, a silicon dioxide film 86 was formed to a thickness of about 50 Å. Subsequently, sputtering was conducted by using a gas mixture of Ar gas and $N_2$ gas as a sputtering gas, under a gas pressure of 10 mTorr and using sintered tantalum oxide target, to form a tantalum oxide film 87 to a thickness of 800 Å. Then, sputtering was conducted using an alloy target comprising TbFeCoCr under a gas pressure of 10 mTorr, to form a $Tb_{22}Fe_{64}Co_{10}Cr_4$ film to a thickness of 300 Å as a first magnetic layer 65. Further, sputtering was conducted by using a GdTbFeCo alloy target at a gas pressure of 5 mTorr to form a $Gd_{25}Tb_5Fe_{50}Co_{20}$ film to a thickness of 1200 Å as a second magnetic layer 3. Subsequently, a tantalum oxide film 88 was formed to a thickness of 200 Å. Finally, an Al-Ti alloy film 89 was formed to a thickness of 300 Å, to obtain a magneto-optical recording medium D.

Figure 24:
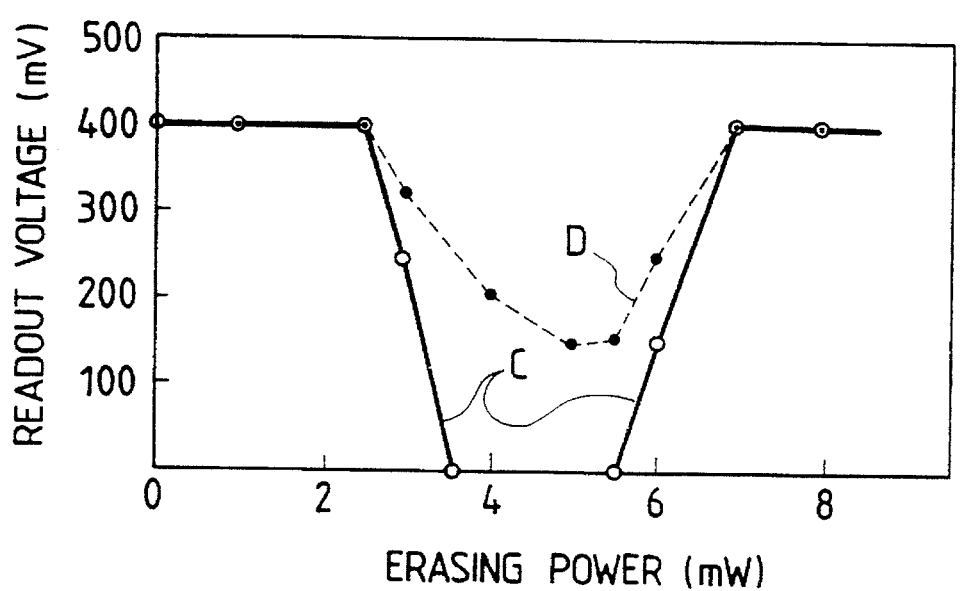
FIG. 24 is a diagram illustrating erasing characteristics.

The thus completed two kinds of magneto-optical recording media C and D were rotated each at a rate of 3600 rpm under an ambient temperature of 25° C., and a not-modulated laser beam with 7 mW at a constant intensity (in a direct current fashion) was irradiated at a position of 45 mm radius, to form a stripe magnetic domain with a width of 0.75 μm. In this case, an optical head comprising a semiconductor laser at a wavelength of 780 nm and a lens with a number of aperture of 0.55 was used. The magneto-optical recording medium was rotated and passed below the initializing magnet. In this case, the magnitude of the initializing magnetic field was set to 2 kOe. Successively, a laser beam at a constant intensity was irradiated to a track in which stripe magnetic domains were recorded and, subsequently, reproducing output was measured by using a read-out power at 1.5 mW. As a result, characteristics as shown in FIG. 24 were obtained. Namely, in the magneto-optical recording medium C, the reproducing output was reduced under the 3.5 mW to a not-recorded stated level, that is, an erased level. This means that the stripe magnetic recording domain was completely erased. Further, increase of the reproducing output from 5.5 mW means the start of the recording. On the contrary, in the magneto-optical recording medium D in the prior art, although the read out intensity is minimized near 5 mW, it does not reach the erase level.

The constitution for the medium according to the present invention is not restricted only to the examples described above. For instance, (1) for the dielectric layer 2 or the protection layer 5, $SiO_x$, $AlN_x$, SiAiON, $ZnS_x$, $ZrO_x$, etc. can be used, (2) for the first magnetic layer 3, the second magnetic layer or the bias layer 75, at least one of rare earth elements such as Gd, Tb, Nd, Dy, Pr and Sm and at least one of transition metals such as Fe, Co, Ni and Cr can be used. In order to improve the corrosion resistivity, Nb, Ti, Pt, Cr, Ta and Ni may be added.

According to the present invention, as shown in FIG. 9 or FIG. 14, a magneto-optical optical medium capable of overwriting at high C/N ratio with no reduction for the C/N ratio by overwriting recording can be obtained. Further, as shown in FIG. 10, a magneto-optical recording medium with no reduction of the C/N ratio even after repeating overwriting recording can be obtained. Further, it is also possible to provide an overwriting method and a magneto-optical recording device using such a magneto-optical recording medium.

Further, in accordance with the present invention, since the magnetic layer comprises three layers of a first magnetic layer having perpendicular anisotropy, a second magnetic layer and a bias layer, in which information is recorded in the recording layer by the irradiation of a modulated laser beam, magnetization in the second magnetic layer is unified in one direction by the magnetic field at a constant intensity and magnetization in the bias layer is not reversed even by the irradiation of the modulated laser beam, or by the magnetic field at a constant intensity, the second magnetic layer can be initialized by a magnetic field with a lower intensity than usual. Accordingly, the size of the initializing magnet can be reduced to thereby reduce the size of a driver.

What is claimed is:

1. A magneto-optical recording medium comprising, on a substrate, at least a first magnetic layer made of a rare earth transition metal alloy, a second magnetic layer made of a rare earth transition metal alloy having a relatively smaller coercivity $Hc_2$ in Oe than that of said first magnetic layer, wherein the following relationship is satisfied at an operation temperature of 5° C. to 50° C.:

$$Hw_1 - Hexc_1 > Hc_2 - Hexc_2$$

where $Hw_1$ represents the magnetic domain wall coercivity of said first magnetic layer in Oe, $Hexc_1$ represents the magnitude of the exchange magnetic field exerted on said first magnetic layer in Oe and $Hexc_2$ represents the magnitude of the exchange magnetic field exerted on said second magnetic layer in Oe.

2. A magneto-optical recording medium as defined in claim 1, wherein $Hw_1$, $Hexc_1$, $Hc_2$ and $Hexc_2$ satisfy the following relationship at said operation temperature:

$$Hw_1 - Hexc_1 - (Hc_2 - Hexc_2) > 2 \text{ kOe} \quad (1)$$

3. A magneto-optical recording medium as defined in claim 1, wherein the first magnetic layer and the second magnetic layer contain a rare earth element and a transition metal element, and at said operation temperature the magnetization of said rare earth element is dominant in the first and second magnetic layers.

4. A magneto-optical recording medium as defined in claim 1, wherein the first magnetic layer and the second magnetic layer contain a transition metal element and a rare earth element, and at said operation temperature the magnetization of said transition element is dominant in the first and second magnetic layers.

5. A magneto-optical recording medium as defined in any one of claims 1 to 4, further comprising a bias layer located opposite a light incident surface of said first and second magnetic layers and having a perpendicular anisotropy and in which the first magnetic layer has a coercivity greater than the initializing magnetic field at a room temperature and a coercivity smaller than a bias magnetic field applied at about the Curie temperature thereof, the second magnetic layer has such a coercivity that the magnetization is aligned to one direction by the initializing magnetic field applied at the room temperature and said bias layer has such a coercivity that the magnetization is not reversed by either the initializing magnetic field or the bias magnetic field.

6. A magneto-optical recording medium as defined in claim 3 or 4, wherein $Hw_1$, $Hexc_1$, $Hc_2$ and $Hexc_2$ satisfy the following relationship at said operation temperature:

$$Hw_1 - Hexc_1 - (Hc_2 - Hexc_2) > 2 \text{ kOe}.$$

7. A magneto-optical recording medium as defined in any one of claims 1 to 4, further comprising a bias layer located opposite a light incident surface of said first and second magnetic layers and having a perpendicular anisotropy, and in which the Curie temperature of the second magnetic layer is higher than that of the first magnetic layer, the Curie temperature of said bias layer is higher than that of said second magnetic layer A and each of the coercivity of said first magnetic layer and said bias layer at room temperature is higher than that of said second magnetic layer.

8. A magneto-optical recording medium as defined in claim 7, wherein a dielectric layer is disposed on at least one of the surfaces of the magnetic layers.

9. A magneto-optical recording medium as defined in claim 7, wherein the first magnetic layer has a thickness within a range from 200 Å to 600 Å.

10. A magneto-optical recording medium as defined in claim 7, wherein the Curie temperature of the first magnetic layer is within a range from 100° C. to 250° C.

11. A magneto-optical recording medium as defined in claim 7, wherein the Curie temperature of the second magnetic layer is within a range from 150° C. to 300° C.

12. A magneto-optical recording medium as defined in claim 7, wherein the Curie temperature of the bias layer is within a range from 250° C. to 450° C.

13. A magneto-optical recording device comprising a medium as defined in claims 1 to 4, means for holding said magneto-optical recording medium, means for applying an initializing magnetic field for aligning only the magnetization in the second magnetic layer of said magneto-optical recording medium to one direction and means for irradiating a light, the intensity of which is modulated into at least two levels.

14. A magneto-optical recording device comprising a medium as defined in claims 1 to 4, means for said holding a magneto-optical recording medium, an optical head for irradiating the magneto-optical recording medium, a moving means for changing the relative position between the magneto-optical recording medium and the optical head, means for applying an initializing magnetic field, means for applying a bias magnetic field and a control means for recording information under control of the optical head, wherein the means for applying the bias magnetic field is a means for applying a magnetic field within a range from 0.5 to 2 kOe.

* * * * *